United States Patent
Hayes, Jr. et al.

(10) Patent No.: US 6,886,525 B1
(45) Date of Patent: May 3, 2005

(54) LOCOMOTIVE ENGINE WITH SKIPFIRE CONTROL SYSTEM

(75) Inventors: Rual Hayes, Jr., Waycross, GA (US); Daniel J. Podnar, Boerne, TX (US); Ted E. Stewart, Jacksonville, FL (US)

(73) Assignee: CSXT Intellectual Properties Corporation, Jacksonville, FL (US)

( * ) Notice: Subject to any disclaimer, the term of this patent is extended or adjusted under 35 U.S.C. 154(b) by 7 days.

(21) Appl. No.: 10/684,592

(22) Filed: Oct. 15, 2003

(51) Int. Cl.$^7$ .............................. F02B 77/00
(52) U.S. Cl. ................................ 123/198 F
(58) Field of Search ............... 123/198 F, 481, 123/508, 507, 198 DB, 198 D, 90.16, 90.48

(56) References Cited

U.S. PATENT DOCUMENTS

| | | | |
|---|---|---|---|
| 2,899,951 A | | 8/1959 | Olson et al. |
| 4,790,731 A | * | 12/1988 | Freudenschuss ............ 417/490 |
| 5,438,968 A | | 8/1995 | Johnson et al. |
| 5,647,318 A | * | 7/1997 | Feucht et al. ............... 123/322 |
| 5,826,563 A | | 10/1998 | Patel et al. |
| 5,878,710 A | * | 3/1999 | Ritter et al. .......... 123/198 DB |
| 6,026,786 A | * | 2/2000 | Groff et al. .................. 123/501 |
| 6,286,488 B1 | | 9/2001 | Wisinski |
| 6,405,705 B1 | | 6/2002 | Dunsworth et al. |
| 6,560,867 B2 | * | 5/2003 | Stretch ..................... 29/888.01 |

* cited by examiner

Primary Examiner—Henry C. Yuen
Assistant Examiner—Hyder Ali
(74) Attorney, Agent, or Firm—McGuireWoods LLP

(57) ABSTRACT

A skipfire control system for use in a locomotive engine includes a plurality of skipfire mechanisms. Each skipfire mechanism is operatively associated with a respective injector rocker arm of the plurality of cylinders of the engine. Each skipfire mechanism includes an actuator movable between an inoperative position wherein the actuator allows the camshaft of the engine to engage and move the associated injector rocker arm to actuate the associated fuel injector, and an operative position wherein the actuator disengages the associated injector rocker arm from the camshaft to prevent the associated rocker arm from actuating the associated fuel injector. A skipfire controller is operatively connected to the skipfire mechanisms and is responsive to an engine operating parameter to actuate selected ones of the skipfire mechanisms to move the actuators thereof to operative positions to prevent actuation of the fuel injectors associated with the selected ones of the skipfire mechanisms.

23 Claims, 22 Drawing Sheets

LOCOMOTIVE ENGINE WITH SKIPFIRE CONTROL SYSTEM

FIELD OF THE INVENTION

The present invention relates to locomotive engines. More particularly, the present invention relates to the use of skipfiring of the locomotive engine to reduce exhaust emissions and fuel consumption.

BACKGROUND AND SUMMARY OF THE INVENTION

At low engine speeds, a locomotive engine does not need to have fuel delivered to all the cylinders to operate. However, in conventional systems, the fuel is continuously delivered to all the cylinders irrespective of engine speed, and this in turn means unnecessary fuel is being wasted, and in turn unnecessary emissions are being generated.

It is known to selectively cut off fuel delivery to a select amount of engine cylinders (called "skipfire" because firing of these cylinders is skipped over), leaving enough cylinders operating to maintain engine speed. This in turn reduces fuel consumption and emissions. Once engine speed picks back up above a predetermined threshold, the system will return to normal operation and enable fuel delivery to all engine cylinders for delivering full power.

Known skipfiring systems are provided in electronic fuel injected engines in which a controller electronically and individually controls the injectors. Examples of such skipfiring systems are disclosed in U.S. Pat. Nos. 5,826,563; 6,286,488; and 6,405,705.

However, known engines also feature mechanical control of fuel injectors as distinguished from electronic control. That is, the engines include rocker arm assemblies that cooperate with the camshaft of the engine to mechanically actuate the fuel injectors.

One aspect of the present invention is to provide a skipfire control system for use with locomotive engines using mechanically controlled fuel injectors.

In accordance with the principles of the present invention, this aspect may be achieved by providing a skipfire control system for use in a locomotive engine including a plurality of fuel injected cylinders, each of the plurality of cylinders having a fuel injector and an injector rocker arm movable to actuate the fuel injector to inject fuel to the associated cylinder. The engine also includes a camshaft engagable with each of the injector rocker arms to move the rocker arms for actuation of the fuel injectors. The skipfire control system comprises a plurality of skipfire mechanisms, each of the plurality of skipfire mechanisms being operatively associated with a respective injector rocker arm of the plurality of cylinders. Each of the plurality of skipfire mechanisms includes an actuator movable between (1) an inoperative position wherein the actuator allows the camshaft to engage and move the associated injector rocker arm to actuate the associated fuel injector, and (2) an operative position wherein the actuator disengages the associated injector rocker arm from the camshaft to prevent the associated rocker arm from being moved by the camshaft to actuate the associated fuel injector. A skipfire controller is operatively connected to the plurality of skipfire mechanisms. The skipfire controller is responsive to an engine operating parameter to actuate selected ones of the plurality of skipfire mechanisms so as to move the actuators thereof to the operative positions to thereby prevent actuation of the fuel injectors associated with the selected ones of the plurality of skipfire mechanisms.

Another aspect of the invention relates to a locomotive comprising an engine including a plurality of fuel injected cylinders, each cylinder having a fuel injector and an injector rocker arm movable to actuate the fuel injector to inject fuel to the associated cylinder. The engine also includes a camshaft engagable with each of the injector rocker arms to move the rocker arms for actuation of the fuel injectors. The locomotive also includes a skipfire control system comprising a plurality of skipfire mechanisms. Each of the plurality of skipfire mechanisms is operatively associated with a respective injector rocker arm of the plurality of cylinders. Each of the plurality of skipfire mechanisms includes an actuator movable between (1) an inoperative position wherein the actuator allows the camshaft to engage and move the associated injector rocker arm to actuate the associated fuel injector, and (2) an operative position wherein the actuator disengages the associated injector rocker arm from the camshaft to prevent the associated rocker arm from being moved by the camshaft to actuate the associated fuel injector. A skipfire controller is operatively connected to the plurality of skipfire mechanisms. The skipfire controller is responsive to an engine operating parameter to actuate selected ones of the plurality of skipfire mechanisms so as to move the actuators thereof to the operative positions to thereby prevent actuation of the fuel injectors associated with the selected ones of the plurality of skipfire mechanisms.

Still another aspect of the invention relates to a method of skipfiring a locomotive diesel engine including a plurality of fuel injected cylinders, each of the plurality of cylinders having a fuel injector and an injector rocker arm movable to actuate the fuel injector to inject fuel to the associated cylinder. The engine also includes a camshaft engagable with each of the injector rocker arms to move the rocker arms for actuation of the fuel injectors. The method comprises providing a plurality of skipfire mechanisms, each of the plurality of skipfire mechanisms operatively associated with a respective injector rocker arm of the plurality of cylinders. Each of the plurality of skipfire mechanisms includes an actuator movable between (1) an inoperative position wherein the actuator allows the camshaft to engage and move the associated injector rocker arm to actuate the associated fuel injector, and (2) an operative position wherein the actuator disengages the associated injector rocker arm from the camshaft to prevent the associated rocker arm from being moved by the camshaft to actuate the associated fuel injector. The method also comprises monitoring an engine operating parameter, and actuating selected ones of the plurality of skipfire mechanisms responsive to the engine operating parameter so as to move the actuators thereof to the operative positions to thereby prevent actuation of the fuel injectors associated with the selected ones of the plurality of skipfire mechanisms.

These and other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
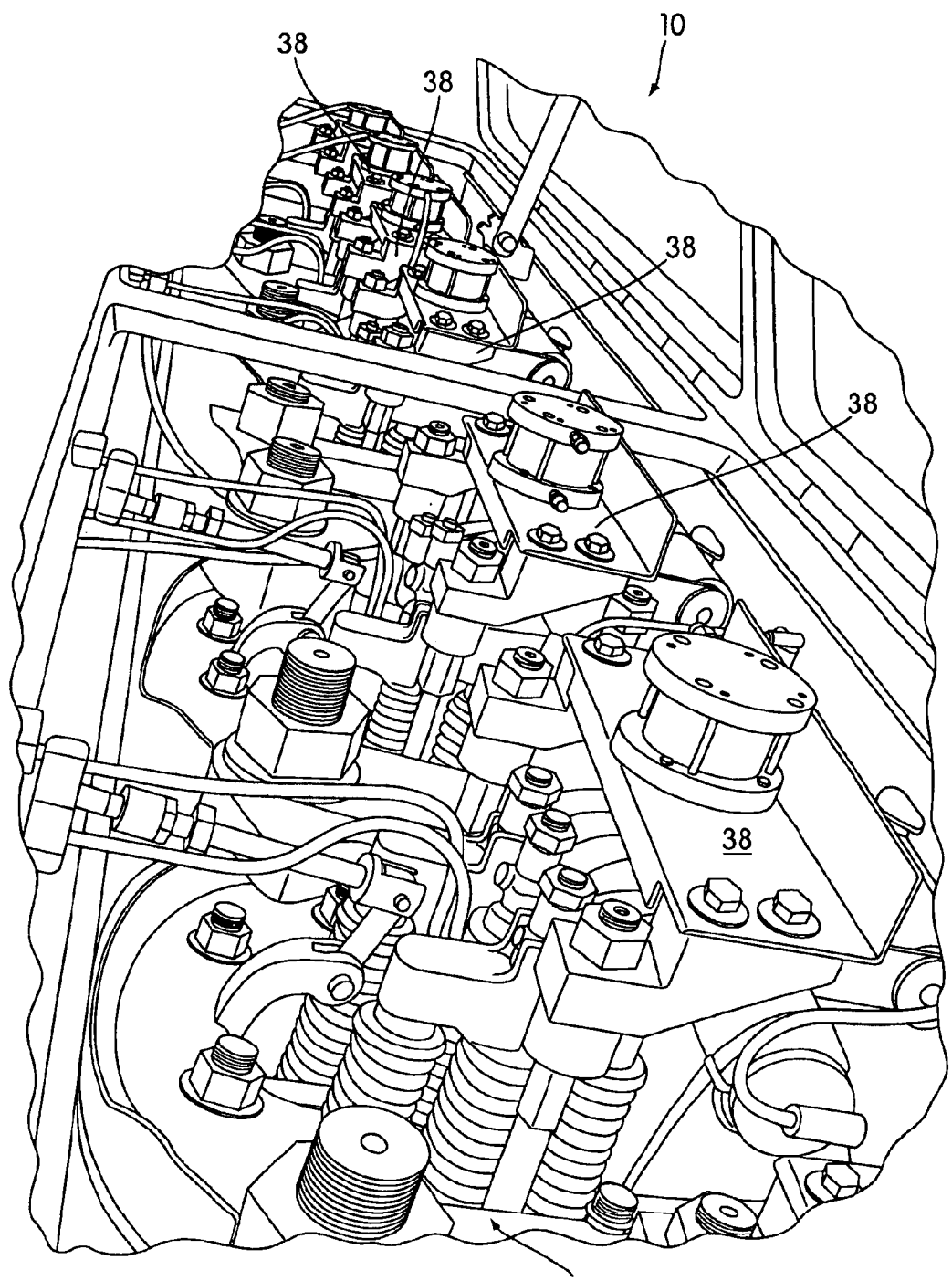
FIG. 1 is a perspective view of a locomotive engine having a skipfire control system constructed in accordance with an embodiment of the invention.

FIGS. 1 and 3–12 illustrate an embodiment of a skipfire control system 10 for use in a locomotive engine 12, such as of the diesel type. The skipfire control system 10 reduces fuel consumption and emissions at low engine speeds by cutting off fuel deliveries to some of the cylinders 14 of the engine 12 when an engine operating parameter (e.g., the engine speed falling below a predetermined threshold) has been identified. The skipfire control system 10 can be incorporated into a new engine or retrofit to existing engines to provide skipfiring operation.

In the illustrated embodiment, the engine 12 is a two-stroke diesel engine of the General Motors EMD engine line. However, the engine 12 may be of the four-stroke type and may be of any other suitable engine line.

The engine 12 has a plurality of individually controllable fuel injected cylinders 14. Typically, 12 or 16 cylinders, and possibly 20 cylinders, are provided. However, the engine 12 may have any number of cylinders 14. Each of the plurality of cylinders 14 includes a plurality of exhaust valves 13 and a diesel fuel injector 15 (see FIGS. 6 and 7). Typically, four exhaust valves 13 are provided per cylinder 14. However, each cylinder 14 may include any suitable number of exhaust valves 13.

Figure 2:
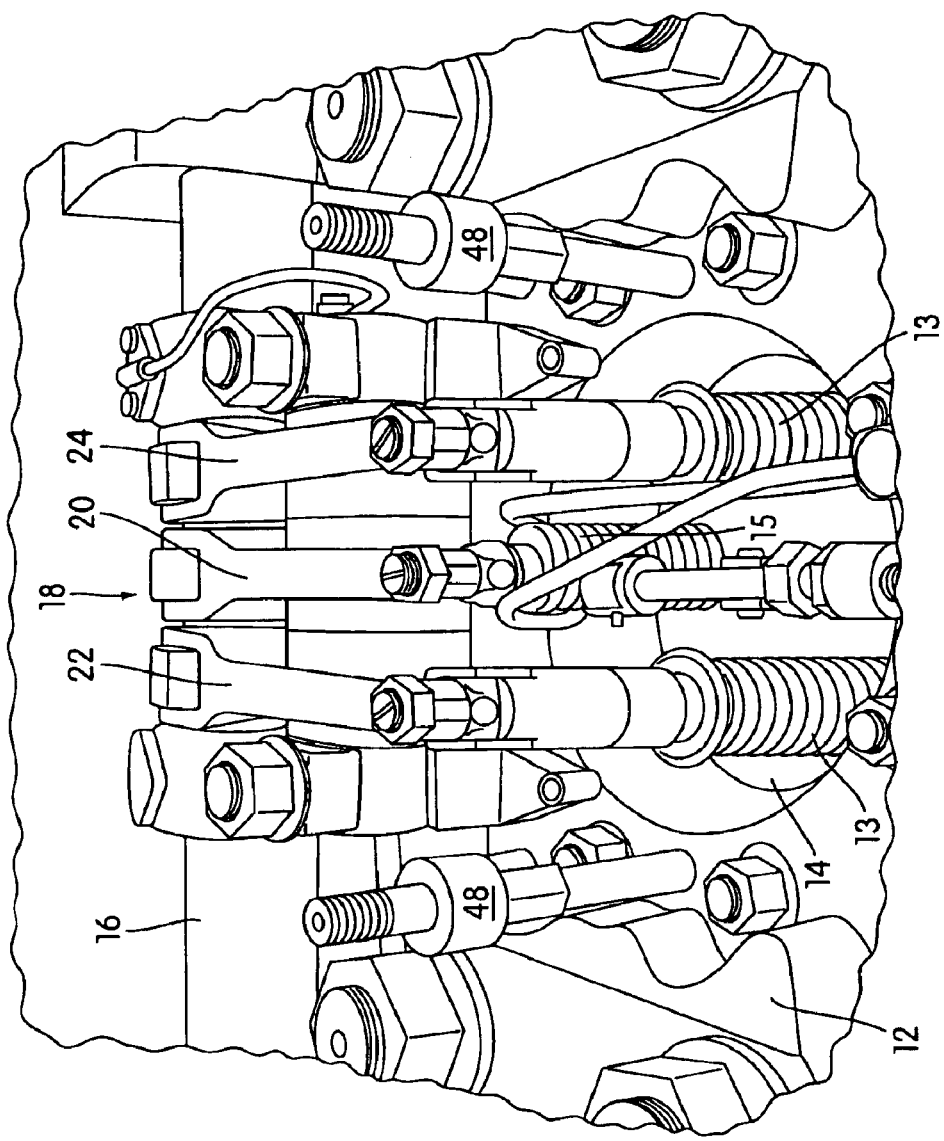
FIG. 2 is an enlarged perspective view of an engine cylinder and a rocker arm assembly for actuating the associated fuel injector and exhaust valves.
Figure 3:
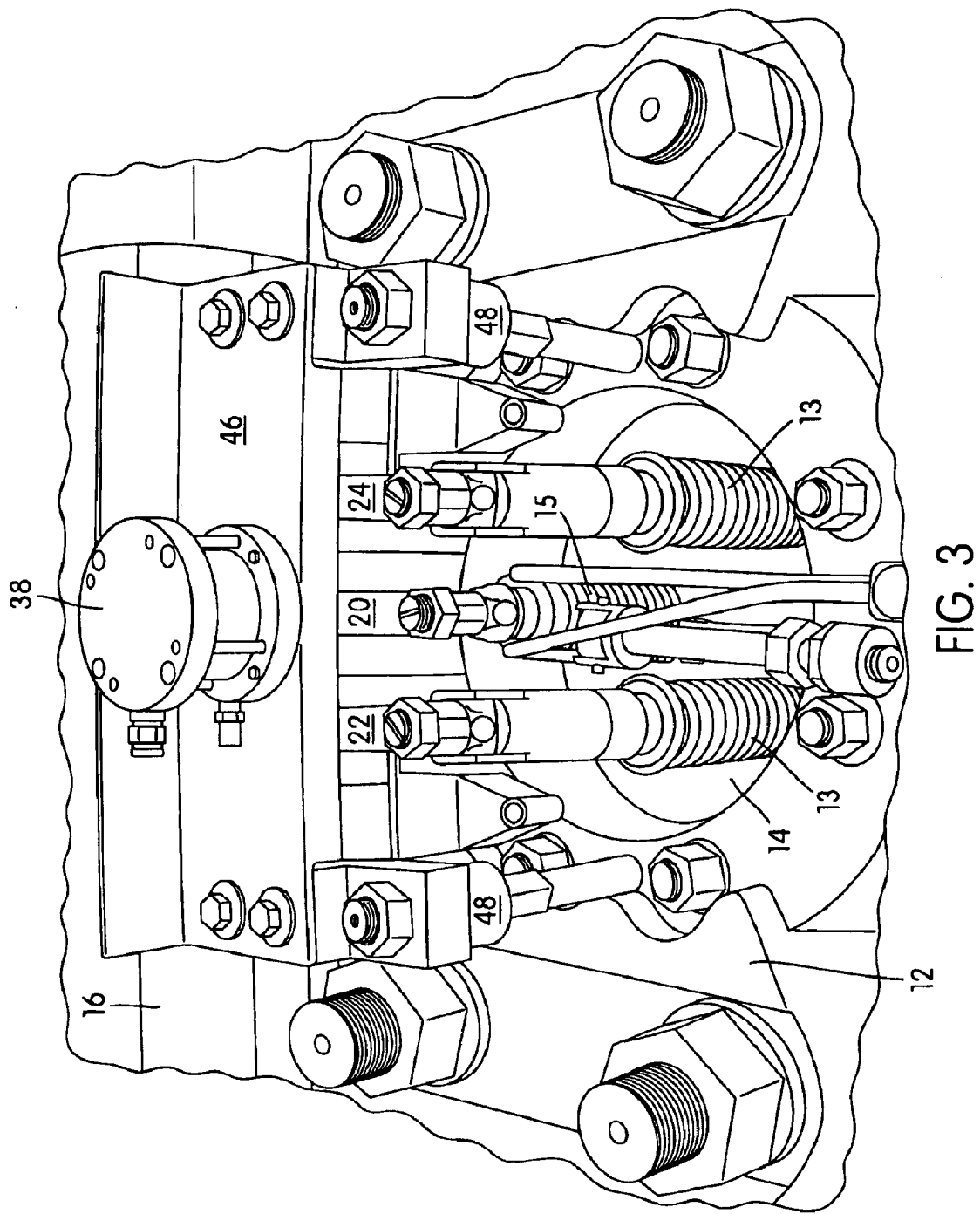
FIG. 3 is an enlarged perspective view of a skipfire mechanism of the skipfire control system shown in FIG. 1.
Figure 4:
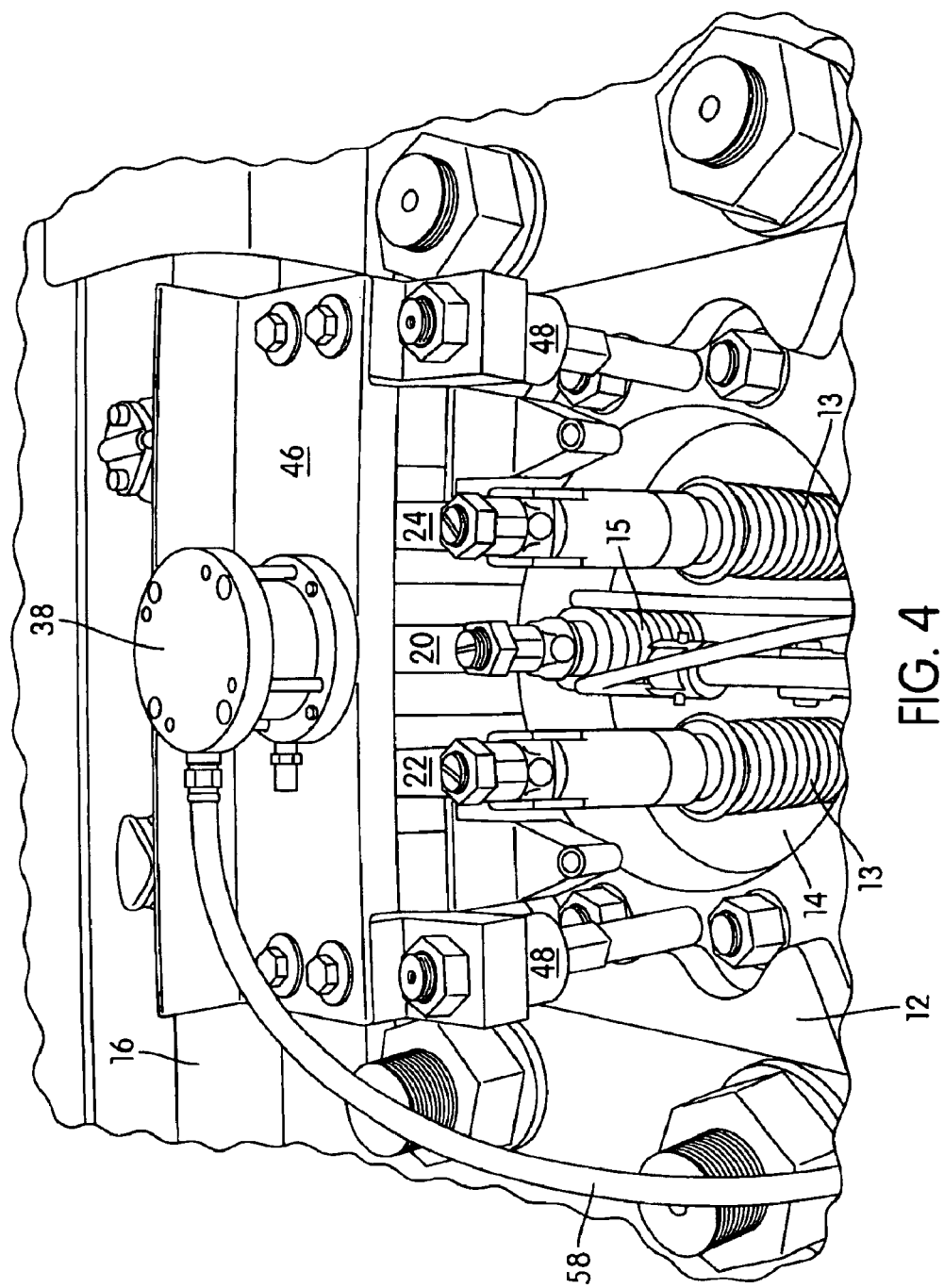
FIG. 4 is a view similar to FIG. 3 with the skipfire mechanism connected to an air supply line.
Figure 5:
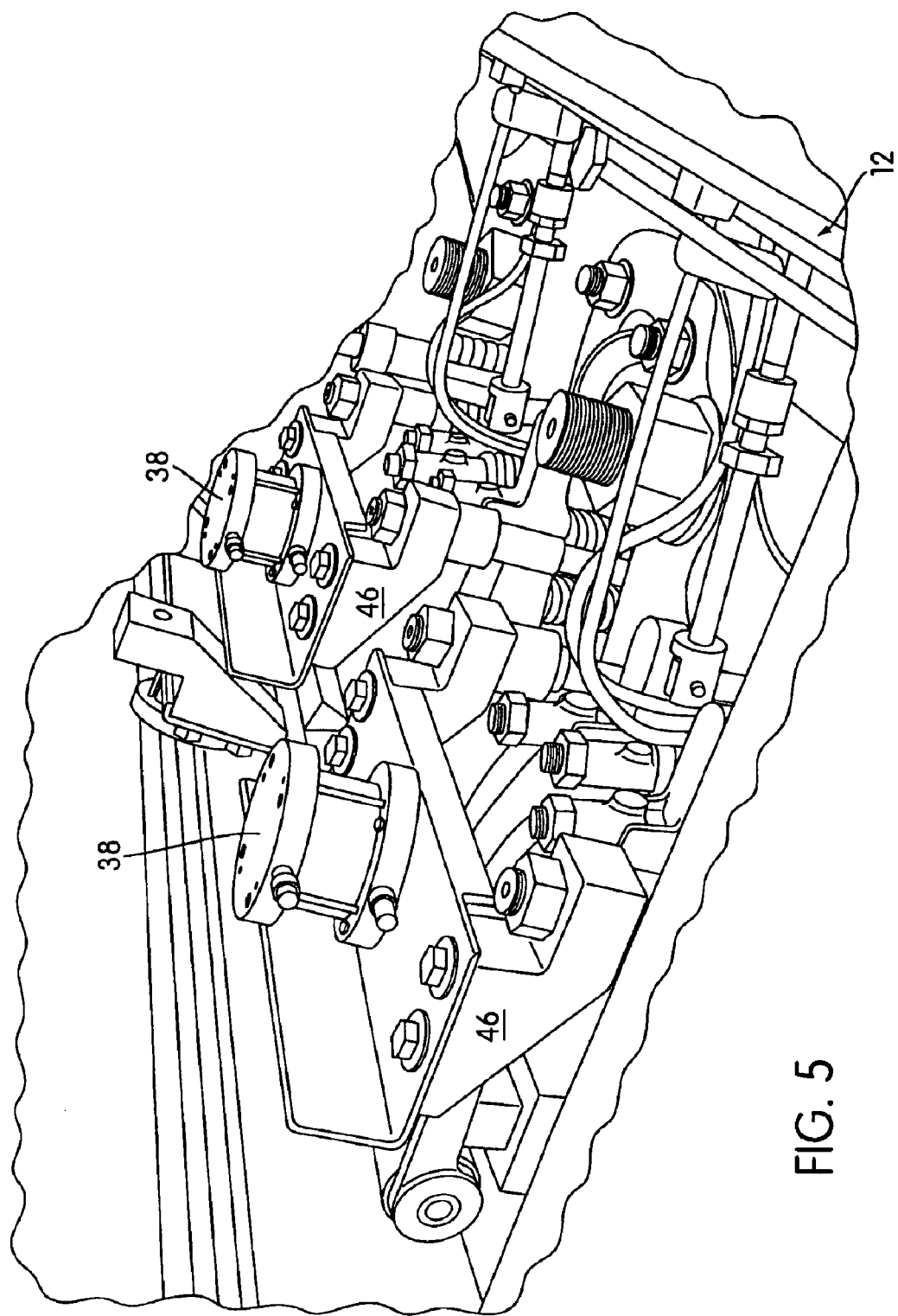
FIG. 5 is a perspective view illustrating a skipfire mechanism being mounted to the engine.

The diesel engine 12 includes a piston-driven output or drive shaft that is operatively coupled to a pair of camshafts 16 (one of which is shown in FIGS. 2–4, for example) by an endless chain or belt, for example. Thus, the camshafts 16 are coupled to the output shaft of the engine 12 so as to be driven by the output shaft and rotate under power from the engine 12.

Figure 6:
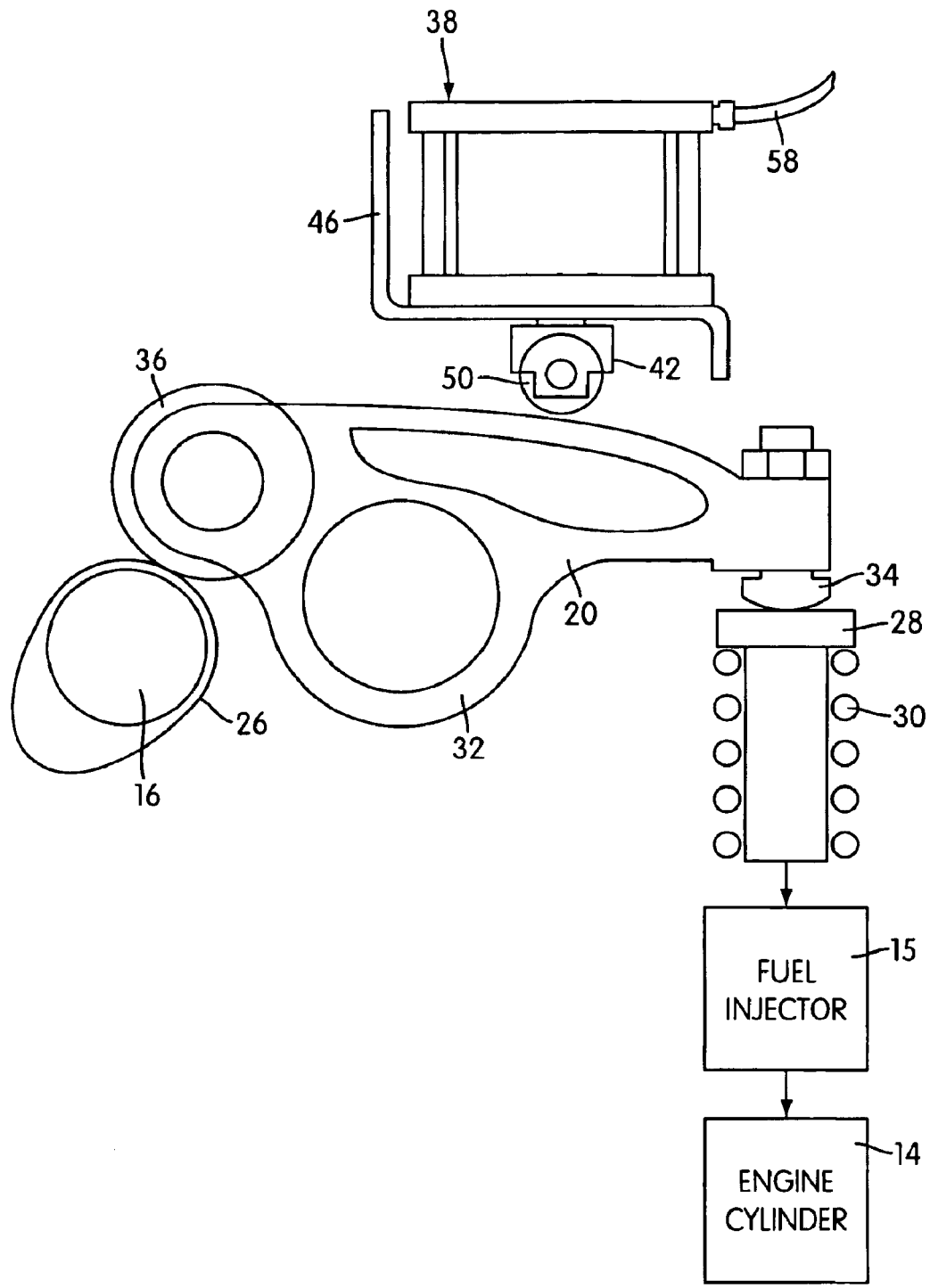
FIG. 6 is a schematic view illustrating the skipfire mechanism shown in FIG. 3 with the actuator thereof in an inoperative position.
Figure 7:
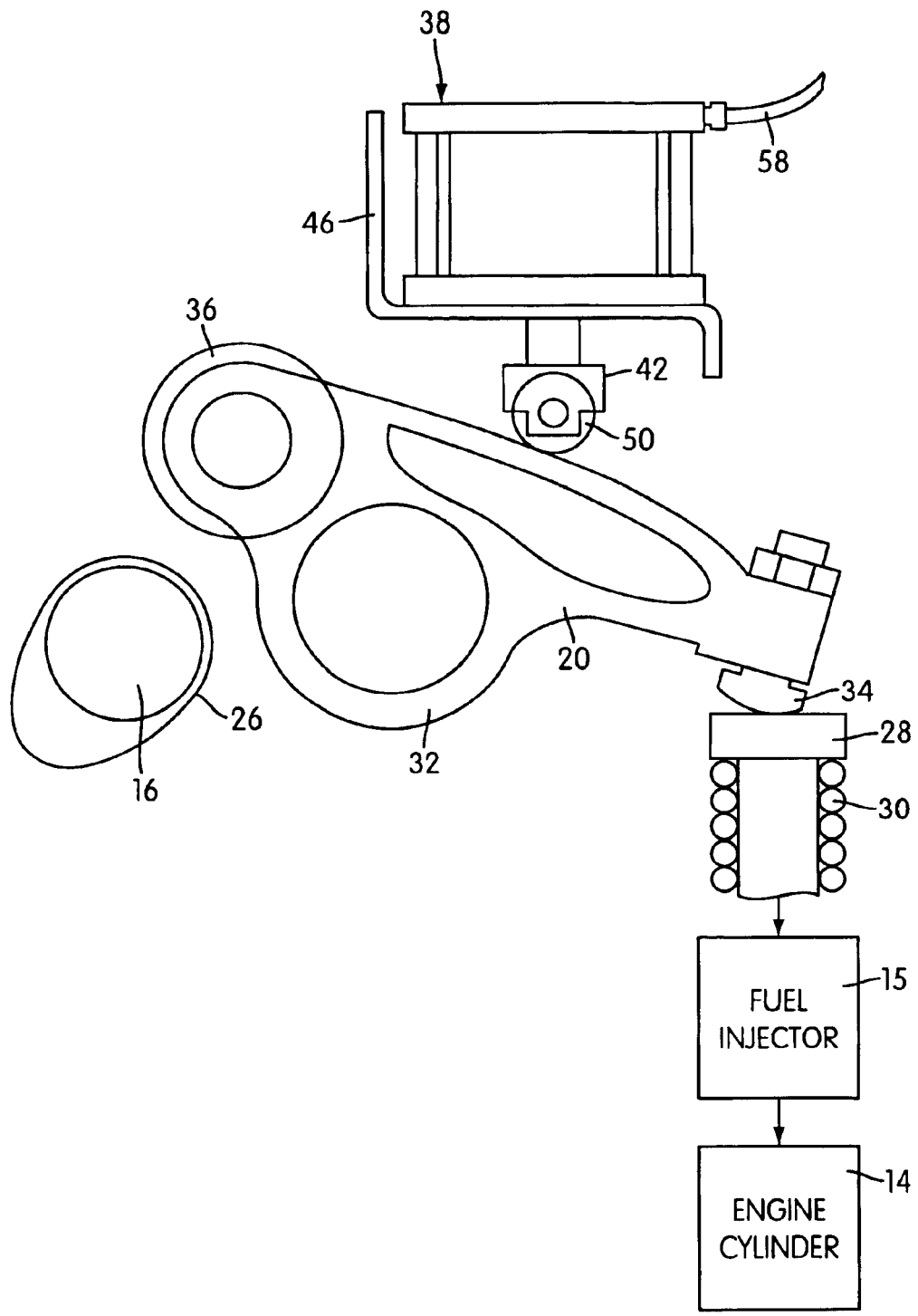
FIG. 7 is a schematic view illustrating the skipfire mechanism shown in FIG. 3 with the actuator thereof in an operative position.

As best shown in FIGS. 2, 6, and 7, the fuel injector 15 and exhaust valves 13 are actuated by a rocker arm assembly 18 that is associated with a respective camshaft 16 of the engine 12. As illustrated, each rocker arm assembly 18 includes an injector rocker arm 20 movable to actuate the fuel injector 15 to inject fuel to the associated cylinder 14. The injector rocker arm 20 is flanked on both sides by rocker arms 22, 24 for actuating the exhaust valves 13. As illustrated, the rocker arm 22 actuates two exhaust valves 13 and the rocker arm 24 actuates two exhaust valves 13.

As is known in the art, the camshaft 16 is engagable with each of the injector rocker arms 20 to move the injector rocker arms 20 for actuation of the fuel injectors 15. That is, the rocker arms 20, 22, 24 cooperate with cams provided on the respective camshaft 16 for actuating the respective fuel injector 15 and exhaust valves 13 at the proper time. For example, FIG. 6 illustrates a cam 26 of the camshaft 16 engaged in a cooperating camming relation with an injector rocker arm 20.

As shown in FIGS. 6 and 7, the injector 15 includes an injector plunger 28 that is movable from an extended position (as shown in FIG. 6) to a depressed position (as shown in FIG. 7) to actuate the injector 15 by injecting fuel into the associated cylinder 14. The plunger 28 is biased by a spring 30 into the extended position. Movement of the plunger 28 is under the control of the injector rocker arm 20. The injector rocker arm 20 is moved by the camshaft 16 from a first position (as shown in FIG. 6) to a second position (as shown in FIG. 7).

Specifically, the injector rocker arm 20 includes a mounting portion 32 that mounts the injector rocker arm 20 for pivotal movement between the first and second positions. One end of the injector rocker arm 20 includes a contact member 34 that is operatively engaged with the plunger 28. The opposite end of the injector rocker arm 20 includes a cam follower 36 operatively engaged with a respective cam 26 provided on the camshaft 16. When the injector rocker arm 20 is moved from its first position to its second position by camming action of the cams 26 on the cam follower 36, the injector rocker arm 20 pushes the plunger 28 against the biasing of spring 30 to its depressed position, thereby actuating the injector 15 to inject fuel into the respective cylinder 14. As the camshaft 16 continues to rotate and cam 26 disengages from cam follower 36, the injector rocker arm 20 is free to pivot and this results in movement of injector rocker arm 20 into its first position under the action of the spring 30 of the plunger 28.

It should be understood that the exhaust valves 13 are actuated by the respective rocker arm 22, 24 in a similar manner as described above with respect to the injector 15 and therefore will not be described in greater detail.

The skipfire control system 10 is operatively associated with the injector rocker arms 20 of the injectors 15 so that the engine 12 can be operated in a skipfiring mode in which fuel delivery to some of the cylinders 14 of the engine 12 is cut. That is, the skipfire control system 10 monitors an engine operating parameter and when the parameter exceeds predetermined thresholds for a predetermined period of time, then the skipfiring mode is initiated. When the engine 12 is operated in skipfiring mode, fuel consumption and exhaust emissions can be reduced.

The skipfire control system 10 includes a plurality of skipfire mechanisms 38 (see FIG. 1) and a skipfire controller 40 (see FIG. 8) for controlling operation of the plurality of skipfire mechanisms 38. As shown in FIGS. 3, 4, 6, and 7, each skipfire mechanism 38 is operatively associated with a respective injector rocker arm 20 of the plurality of cylinders 14 of the engine 12. That is, the number of skipfire mechanisms 38 is equal to the number of cylinders 14 of the engine 12. As a result, one or more specified cylinders 14 may be shut down or skipped over by selectively controlling the plurality of skipfire mechanisms 38.

As best shown in FIGS. 6 and 7, each of the plurality of skipfire mechanisms 38 includes an actuator 42 movable between an inoperative position (as shown FIG. 6) and an operative position (as shown in FIG. 7). In the inoperative position, the actuator 42 of the skipfire mechanism 38 is disengaged from the associated injector rocker arm 20 to allow the camshaft 16 to engage and move the associated injector rocker arm 20 to actuate the associated fuel injector 15. In the operative position, the actuator 42 of the skipfire mechanism 38 engages the associated injector rocker arm 20 to disengage the associated injector rocker arm 20 from the camshaft 16 to prevent the associated rocker arm 20 from being moved by the camshaft 16 to actuate the associated fuel injector 15. As a result, the cylinder 14 is prevented from firing, which conserves fuel and prevents exhaust emission.

The skipfire controller 40 is operatively connected to the plurality of skipfire mechanisms 38 to control operation of the actuator 42 of the plurality of skipfire mechanisms 38 between inoperative and operative positions. That is, the skipfire controller 40 is responsive to an engine operating parameter to selectively actuate selected ones of the plurality of skipfire mechanisms 38 so as to selectively control which of the fuel injectors 15 of the plurality of cylinders 14 are actuated.

By selectively preventing selected rocker arms 20 from engaging the camshaft 16 and thus cutting off fuel delivery to a select amount of engine cylinders 14 (called "skipfire" because firing of these cylinders 14 is skipped over), a sufficient number of cylinders 14 is left operating to maintain engine speed and in turn reduces fuel consumption and exhaust emissions. Once the engine operating parameter returns to a specified threshold, e.g., the engine speed picks back up above a specified threshold, the engine 12 will return to normal operation and enable all the rocker arms 20 to engage the camshaft 16, thus providing fuel delivery to all the engine cylinders 14 for delivering full power.

FIGS. 6 and 7 illustrate an embodiment of a skipfire mechanism 38 that is operatively associated with a respective injector rocker arm 20. The skipfire mechanism 38 is of the pressurized fluid (e.g., air) operated type. Specifically, the skipfire mechanism 38 has a piston/cylinder configuration. That is, each skipfire mechanism 38 includes a cylinder and a piston mounted in the cylinder. The piston has a generally cylindrical outer configuration and an outer periphery having a sealing member disposed in slidable and sealed relation with an inner surface of the cylinder. An actuator 42 is suitably connected with the piston. The cylinder is communicated to a source 44 of pressurized fluid (see FIG. 8) so as to enable the pressurized fluid to move the piston within the cylinder, wherein the movement of the piston moves the actuator 42 between the inoperative and operative positions. In the operative position, the actuator 42 engages the associated injector rocker arm 20 to hold the injector rocker arm 20 in its second position and prevent further actuation of the associated injector 15.

As best shown in FIGS. 3 and 4, the skipfire mechanism 38 is mounted to a support bracket 46 that is supported above the rocker arm assembly 18 by a pair of post members 48 (also see FIG. 2) rigidly secured to the engine 12. However, the skipfire mechanism 38 may be supported above the rocker arm assembly 18 in any other suitable manner, or in any other location.

In the illustrated embodiment, the source 44 of pressurized fluid is an air reservoir for operating locomotive pneumatic brakes. However, the source 44 of pressurized fluid for the skipfire mechanisms 18 may be separate from the source of pressurized fluid for the locomotive brakes.

As shown in FIGS. 6 and 7, a roller 50 is attached to the end of the actuator 42 of the skipfire mechanism 38. The roller 50 is structured to ride along an upper surface of the injector rocker arm 20 as the actuator 42 moves the injector rocker arm 20 between its first and second positions.

Figure 8:
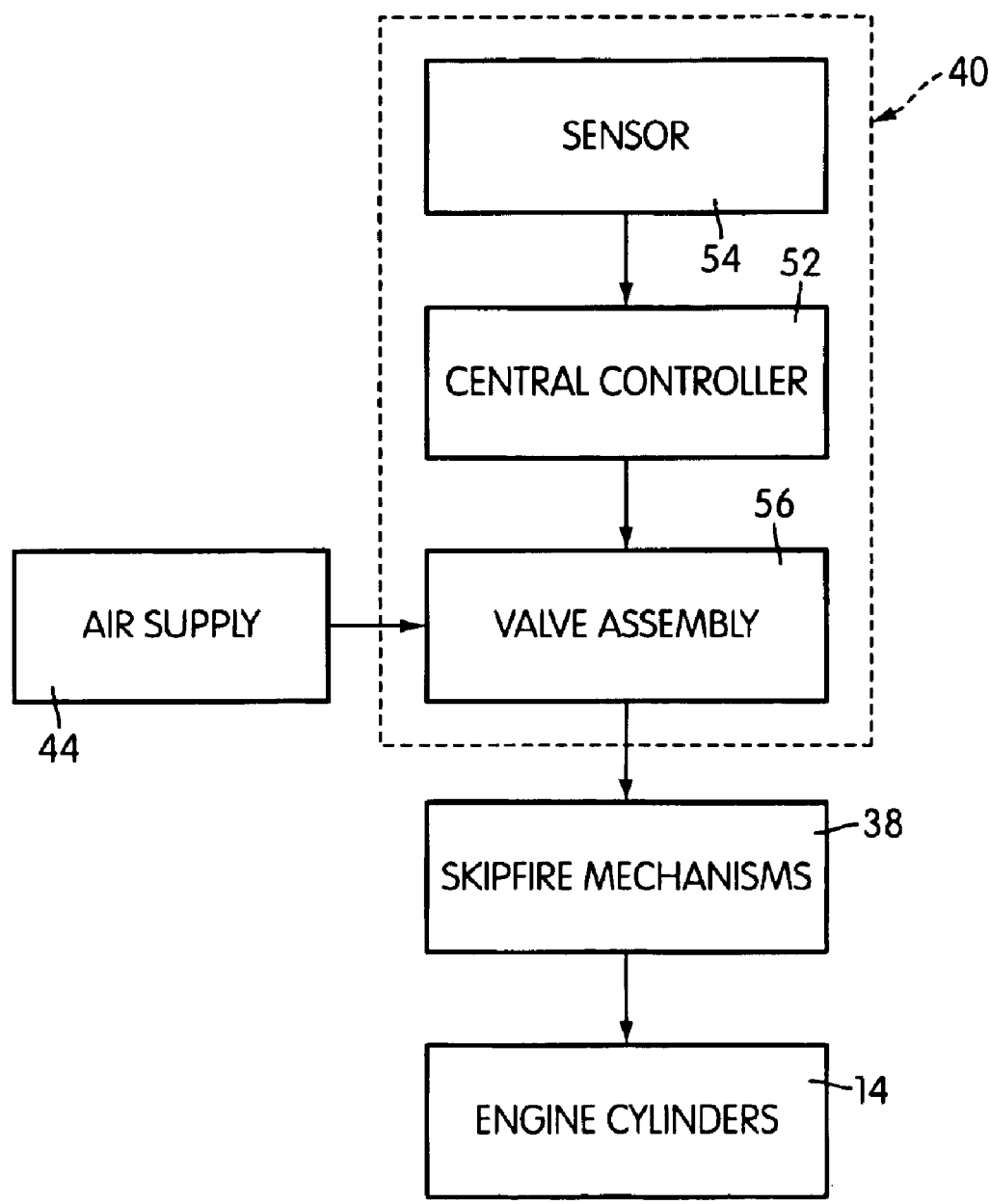
FIG. 8 is a schematic view of the skipfire control system shown in FIG. 1.

As shown in FIG. 8, in the illustrated embodiment the skipfire controller 40 is operatively connected between the air supply 44 and skipfire mechanisms 38 to control actuation of the skipfire mechanisms 38. The skipfire controller 40 is responsive to an engine operating parameter to actuate selected ones of the plurality of skipfire mechanisms 38 so as to move the actuators 42 thereof to the operative positions to thereby prevent actuation of the fuel injectors associated with the selected ones of the plurality of skipfire mechanisms 38. That is, the skipfire controller 40 controls the supply of pressurized air to the skipfire mechanisms 38. Thus, the skipfire controller 40 allows pressurized air to enter the cylinder of the selected skipfire mechanisms 38 to move the actuators 42 thereof into their operative positions.

Figure 9:
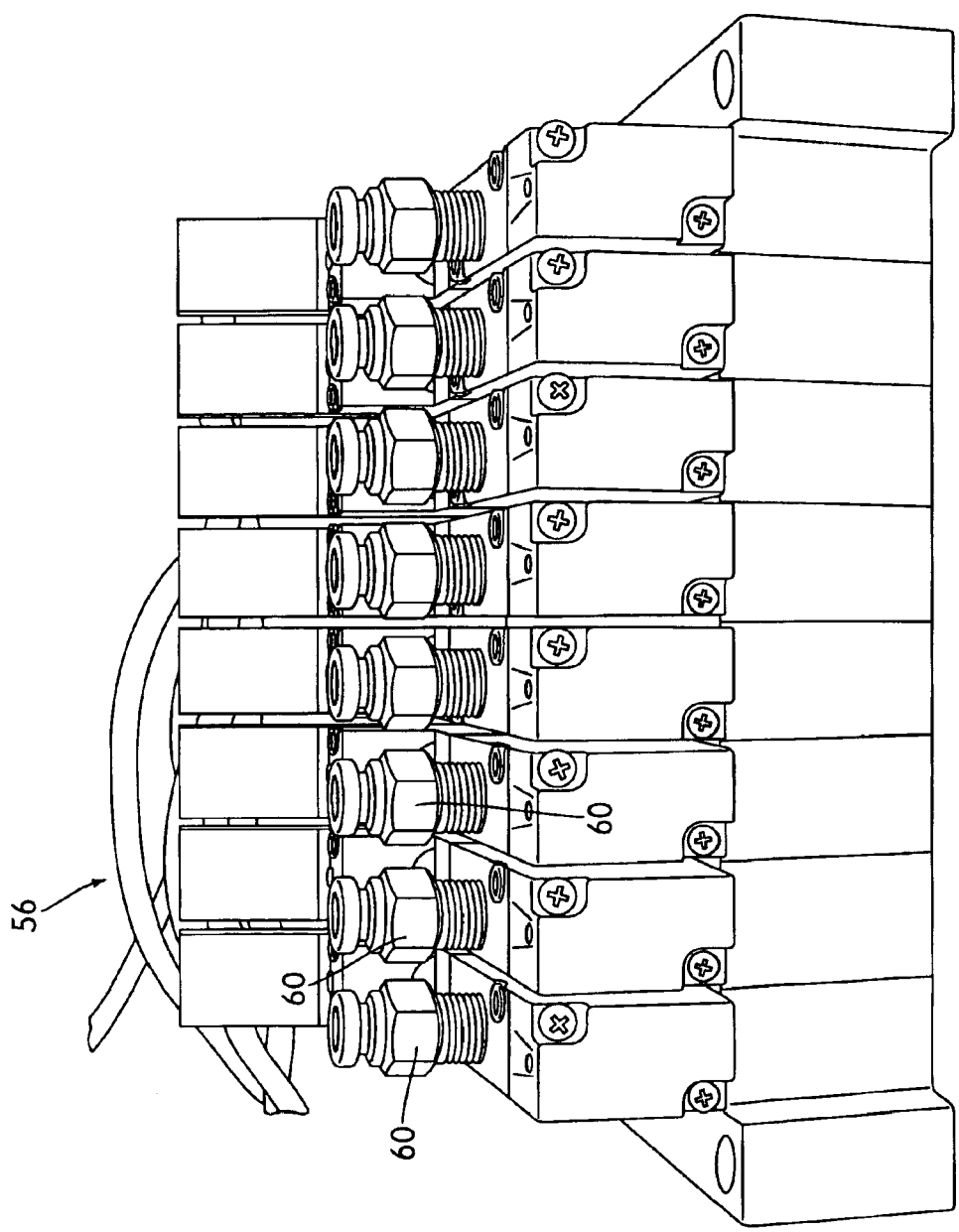
FIG. 9 is a perspective view of a valve assembly of a skipfire controller for the skipfire control system shown in FIG. 1.
Figure 10:
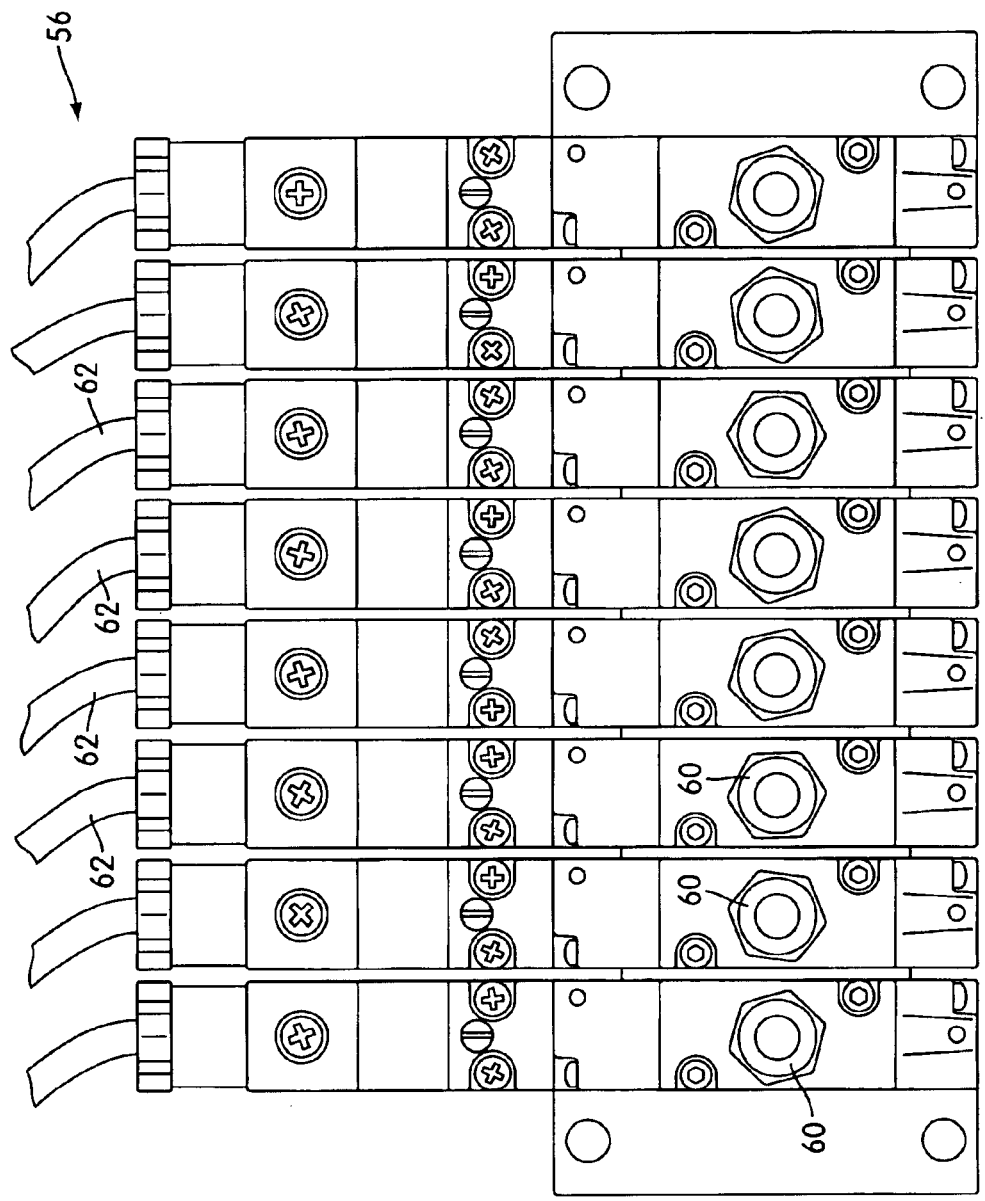
FIG. 10 is a top view of the valve assembly shown in FIG. 9.

Specifically, the skipfire controller 40 includes a central controller 52, a sensor 54, and a valve assembly 56. The valve assembly 56 is connected between the air supply 44 and the plurality of skipfire mechanisms 38. That is, the valve assembly 56 includes one or more input supply lines to interconnect the air supply 44 and valve assembly 56 and a plurality of output supply lines 58 (see FIG. 11) to interconnect the valve assembly 56 and the plurality of skipfire mechanisms 38. The number of output supply lines 58 is equal to the number of skipfire mechanisms 38. As shown in FIGS. 9 and 10, the output supply lines 58 are connected to the valve assembly by electronically controlled valves 60. Any type of valve may be used, such as a solenoid valve.

In the illustrated embodiment, the skipfire controller 40 includes a pair of valve assemblies 56; one valve assembly 56 for half the skipfire mechanisms 38, e.g., eight skipfire mechanisms, and one valve assembly 56 for the other half of the skipfire mechanisms 38, e.g., eight skipfire mechanisms. Thus, eight output supply lines 58 are provided to interconnect the eight skipfire mechanisms 38 and the valve assembly 56 for one half the engine 12. However, any suitable number of valve assemblies 56 may be provided to interconnect the air supply 44 and plurality of skipfire mechanisms 38.

Figure 11:
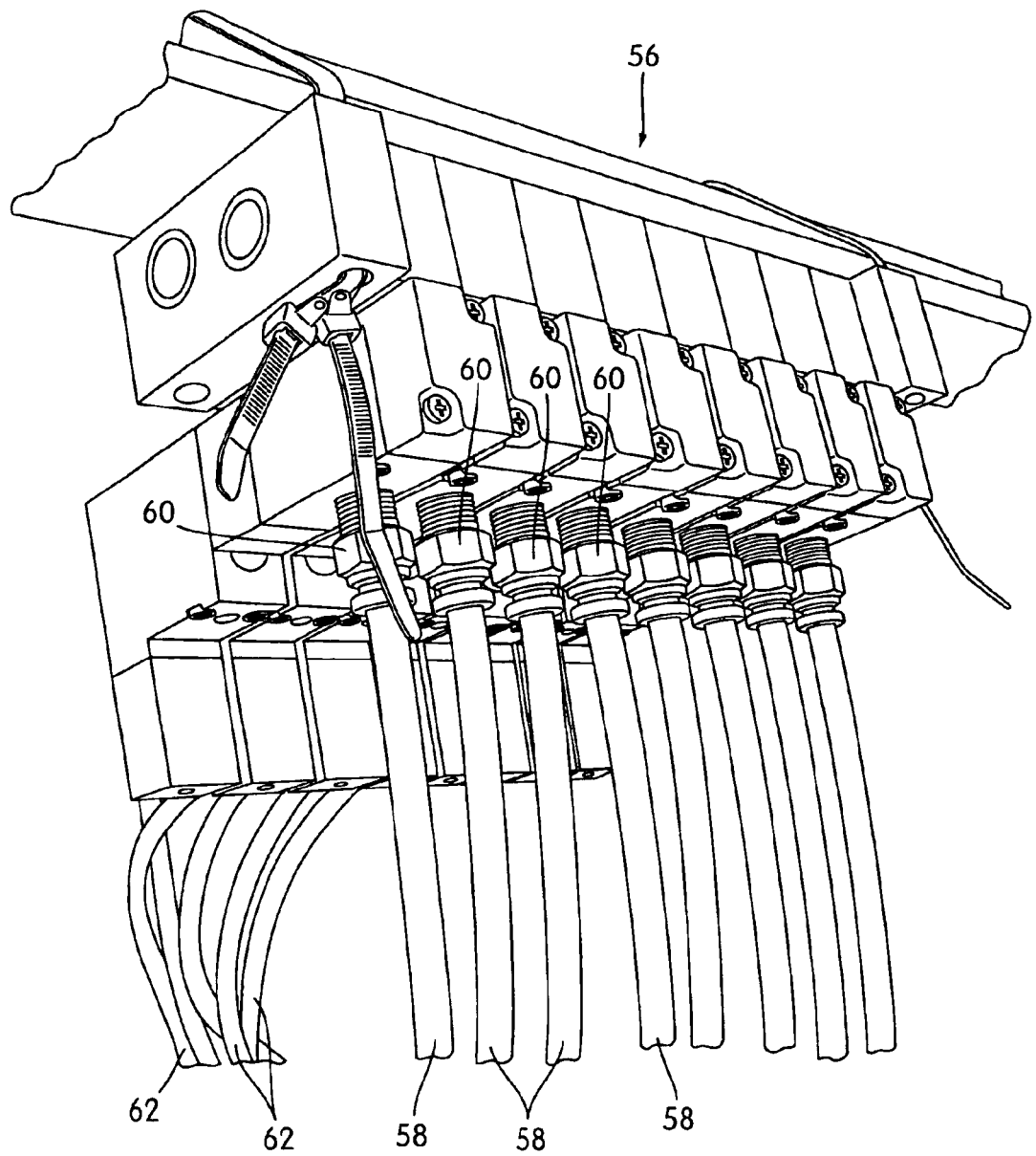
FIG. 11 is a perspective view of the valve assembly shown in FIG. 9 in a mounted position adjacent the engine.

As shown in FIGS. 10 and 11, the valve assembly 56 is connected to the central controller 52 by a plurality of signal lines 62. The number of signal lines 62 is equal to the number of output supply lines 58, i.e., the number of skipfire mechanisms 38. Thus, signals from the central controller 52 can be sent to the valve assembly 56 to control selected ones of the electronically controlled valves 60 for the output supply lines 58, and hence control selected ones of the skipfire mechanisms 38.

As shown in FIG. 8, the sensor 54 is connected to the central controller 52 and monitors an engine operating parameter. The sensor 54 sends the results to the central controller 52 which determines whether or not skipfire mechanisms 38 should be actuated. In the illustrated embodiment, the sensor 54 monitors the engine's speed. However, the sensor 54 may be structured to monitor other engine operating parameters, such as, for example, throttle position.

In use, the sensor 54 determines when the engine speed has fallen below a predetermined threshold for a predetermined period of time (e.g., engine idling for a predetermined period of time) and then signals the central controller 52. The central controller 52 determines how many cylinders 14 need to be fired to maintain engine speed. Then, the central controller 52 selects the cylinders 14 to which fuel delivery will be cut off, and signals the valve assembly 56 so that the selected skipfire mechanisms 38 can be actuated.

Thus, the central controller 52 signals the valve assembly 56 so that selected valves 60 can be opened to allow pressurized air to pass to the selected skipfire mechanism 38 which moves the selected actuator 42 to its operative position so that the selected cylinder 14 of the engine 12 cannot fire. A release valve may be provided to relieve pressure in the cylinder of the skipfire mechanism 38 and allow the spring 30 of the plunger 28 to bias the injector rocker arm 20 and hence the actuator 42 of the skipfire mechanism 38 back into its inoperative position.

As a result, the skipfire control system 10 reduces locomotive diesel engine exhaust emissions and fuel consumption at low speed operations by operating only the necessary number of cylinders 14 required to maintain engine speed. It should be understood that any combination of skipfire patterns can be utilized. That is, the number and selection of firing cylinders 14 can be modified at any time during engine skipfire operation.

The central controller 52 and sensor 54 operations may be integrated into and executed by the ECU (engine control unit) of the engine's original equipment. Alternatively, the skipfire mechanisms 38 and valve assembly 56 may be retrofit to the existing engine and coordinated with the existing ECU to provide skipfiring operation. For example, the sensor 54 could monitor the engine speed by receiving a signal output from the ECU. Although the skipfire control system can be included as part of the original engine design, the embodiment described herein is well suited for use as a retrofit for engines of the type having rocker arm controlled injectors, as it requires little modification of the engine itself.

In the illustrated embodiment, the skipfire mechanisms 38 are actuated by pressurized air. One advantage of using pressurized air is that an air reservoir is already provided for the locomotive brakes. However, the skipfire mechanisms 38 may be actuated in any other suitable manner, e.g., hydraulically or electrically.

In the illustrated embodiment, the skipfire mechanisms 38 are structured to provide a generally downward force that pushes down on one end of the respective injector rocker arm 20 so that the respective cam 26 of the camshaft 16 cannot actuate the respective injector 15 via the injector rocker arm 20. However, it is contemplated that the skipfire mechanisms 38 may be structured provide a generally upward force that lifts up the respective injector rocker arm 20 off the respective cam 26 of the camshaft 16.

In the illustrated embodiment, the skipfire control system 10 may also function as an overspeed trip assembly. That is, if the sensor 54 determines that the engine speed has exceeded a predetermined overspeed limit, the central controller 52 will signal the valve assembly 56 to actuate all the skipfire mechanisms 38 so that all the injectors 15 are prevented from being stroked and the engine 12 shuts down.

Figure 12:
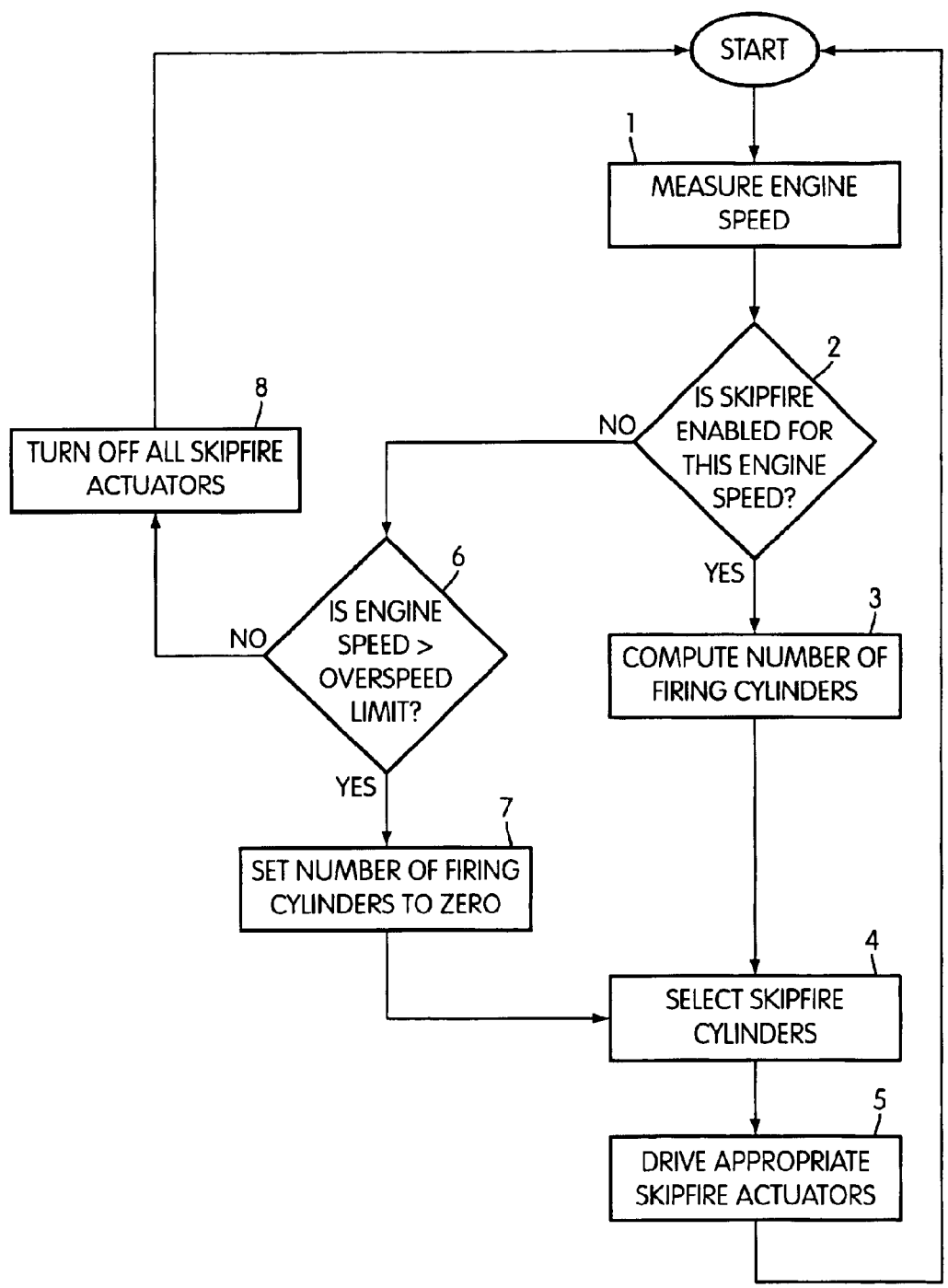
FIG. 12 is a flow chart illustrating an embodiment of the logic used by the skipfire controller of the skipfire control system shown in FIG. 1.
Figure 13:
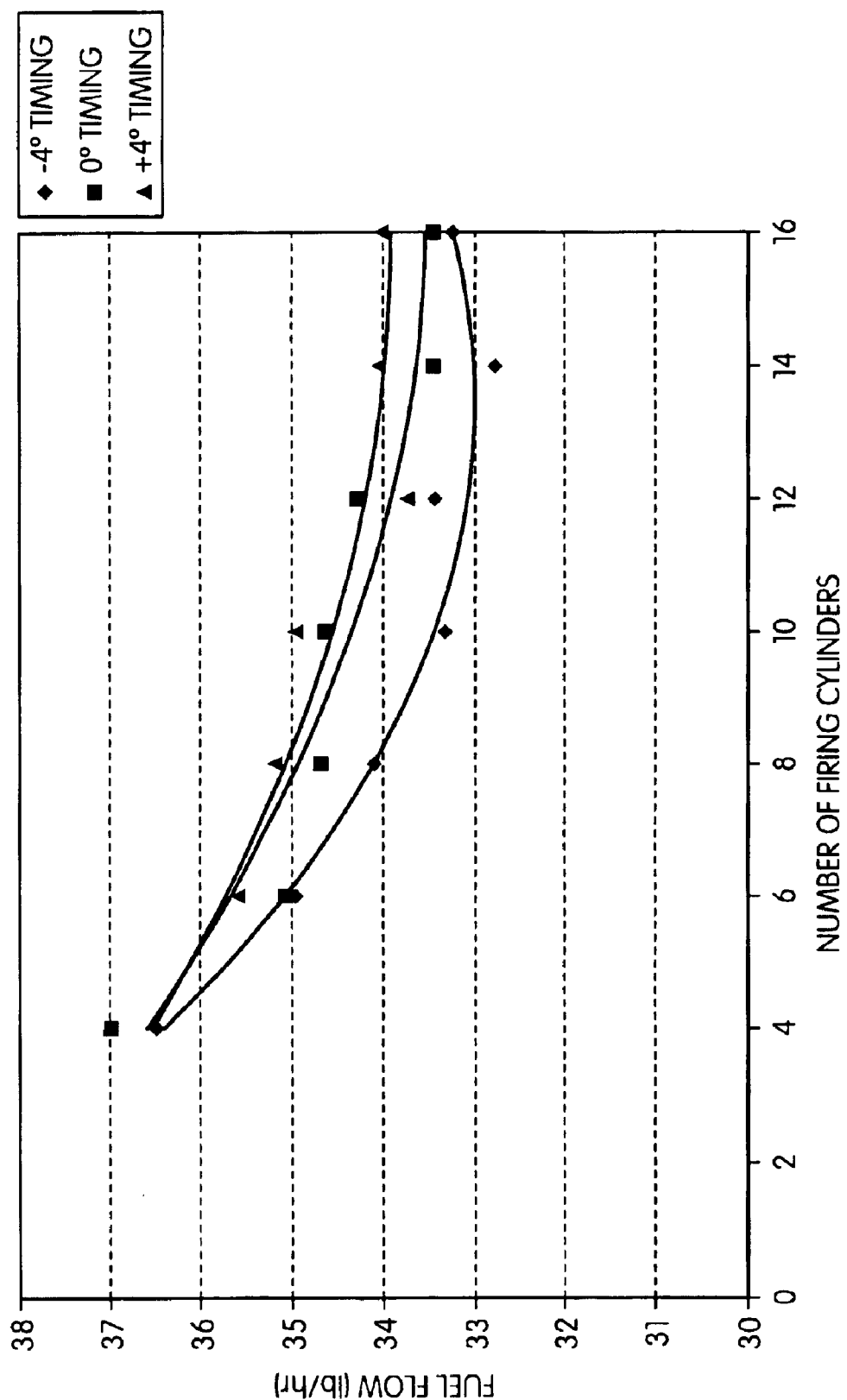
FIG. 13 is a graph illustrating the effect of skipfiring on fuel consumption.
Figure 14:
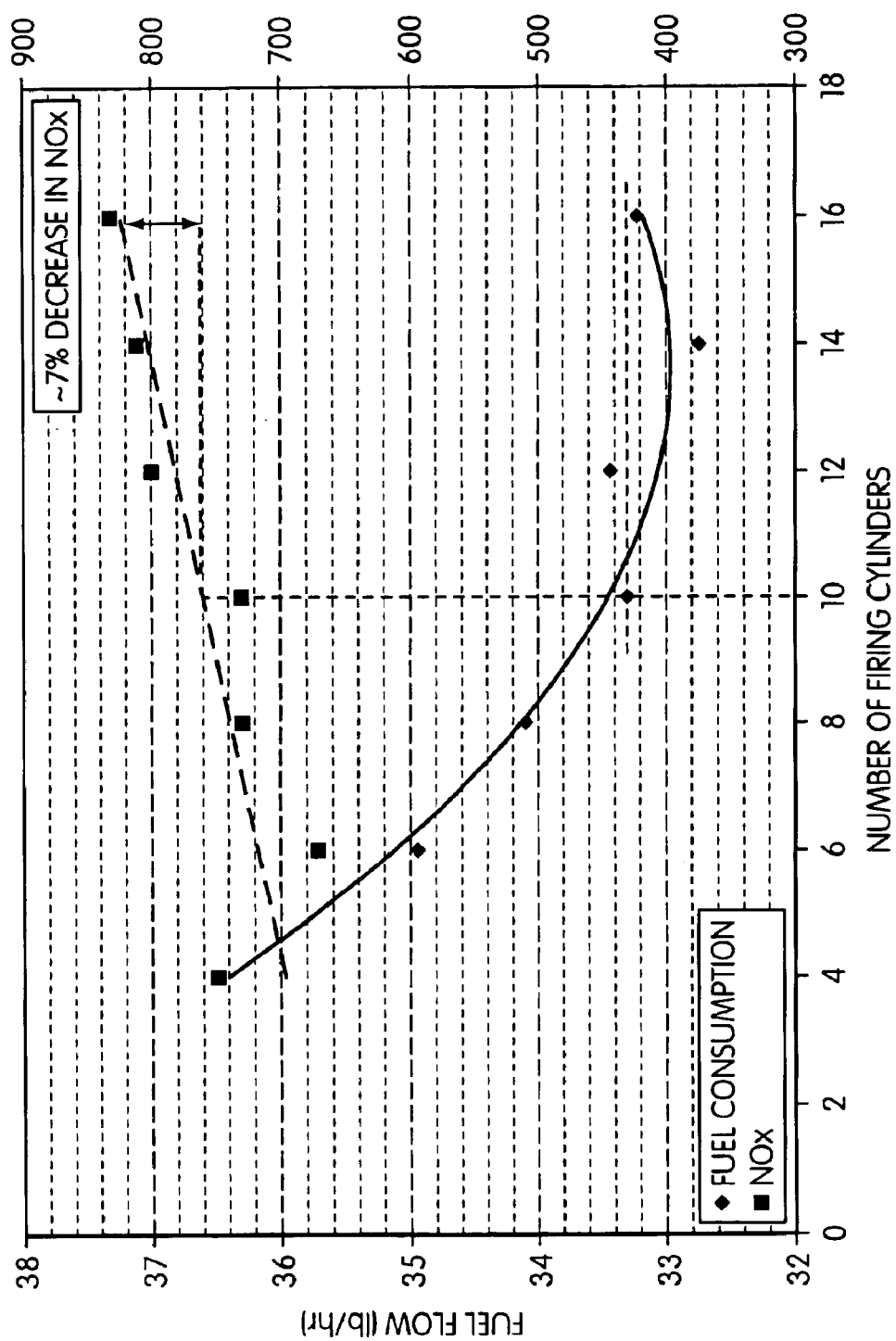
FIG. 14 is a graph illustrating the effect of skipfiring on fuel consumption and NOx.
Figure 15:
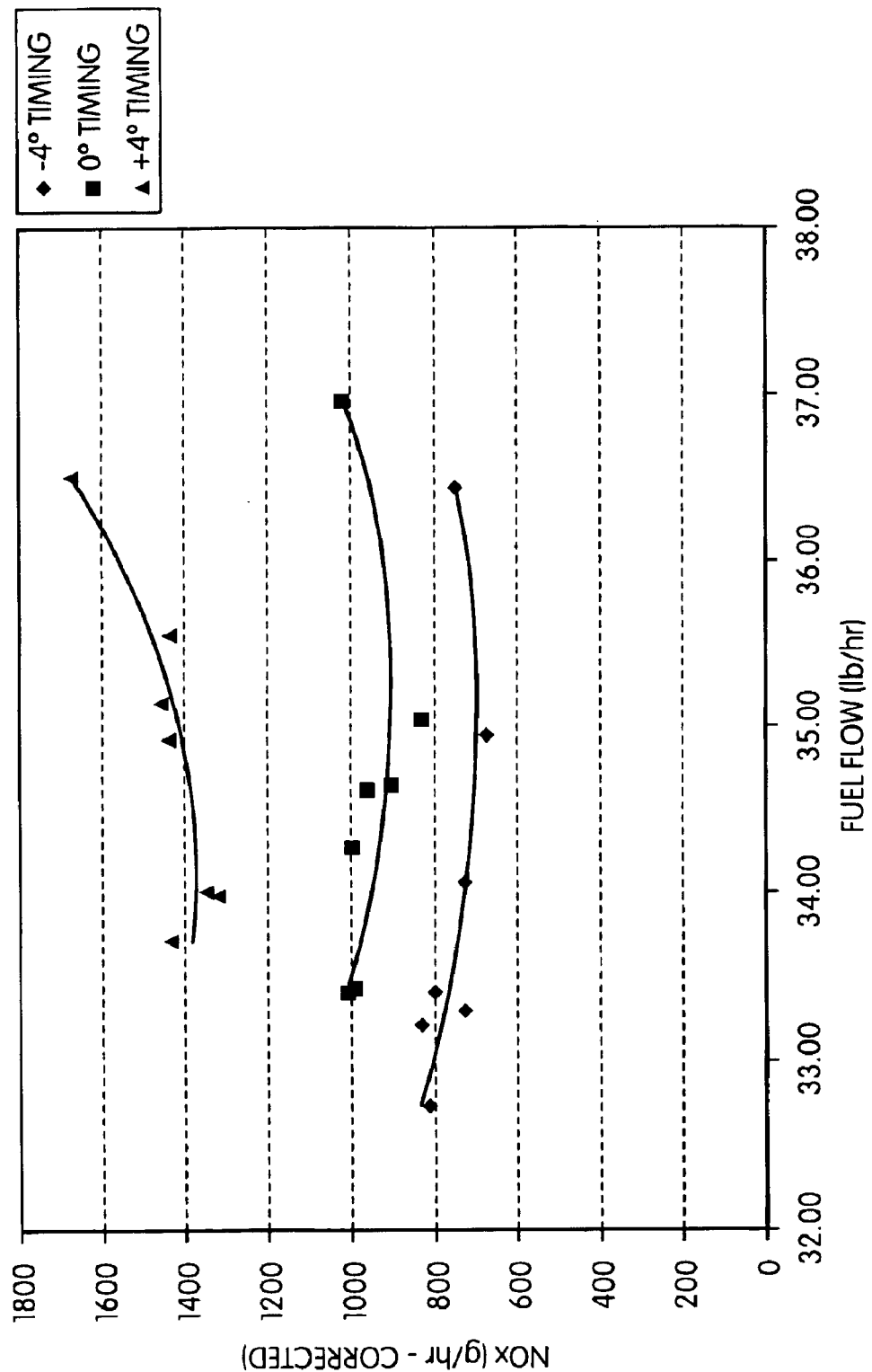
FIG. 15 is a graph illustrating corrected NOx vs. fuel consumption.
Figure 16:
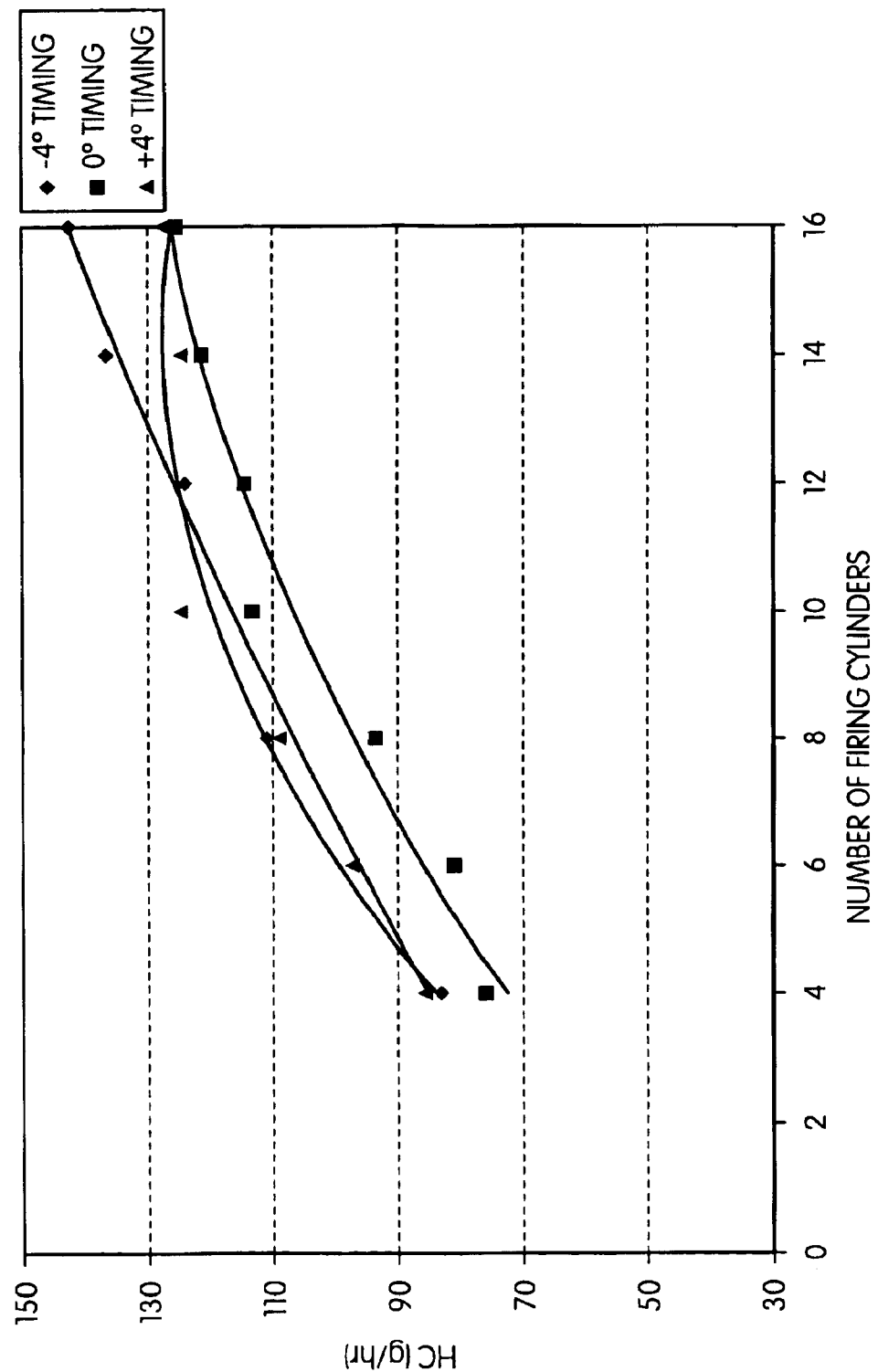
FIG. 16 is a graph illustrating the effect of skipfiring on HC.
Figure 17:
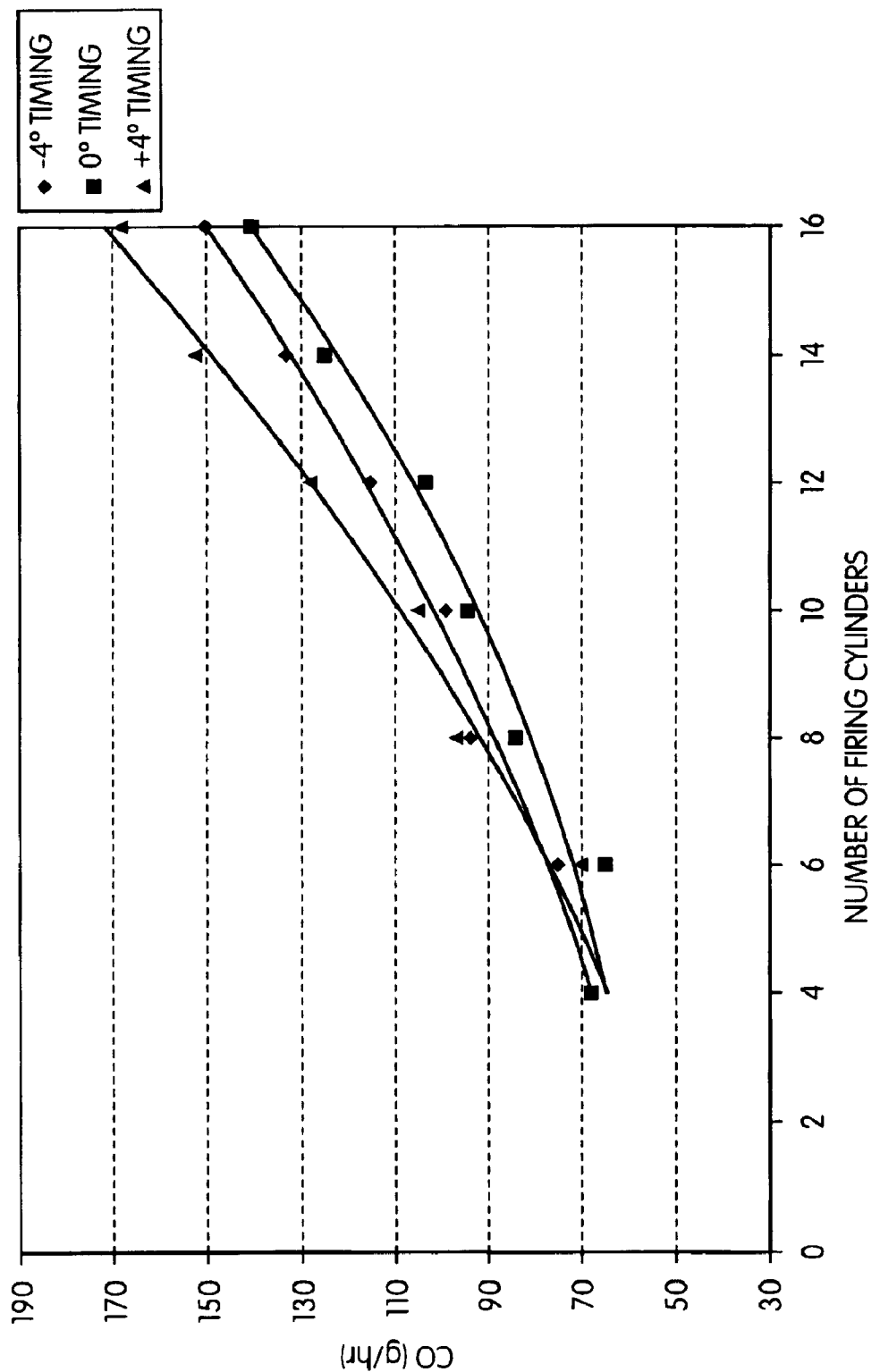
FIG. 17 is a graph illustrating the effect of skipfiring on CO.
Figure 18:
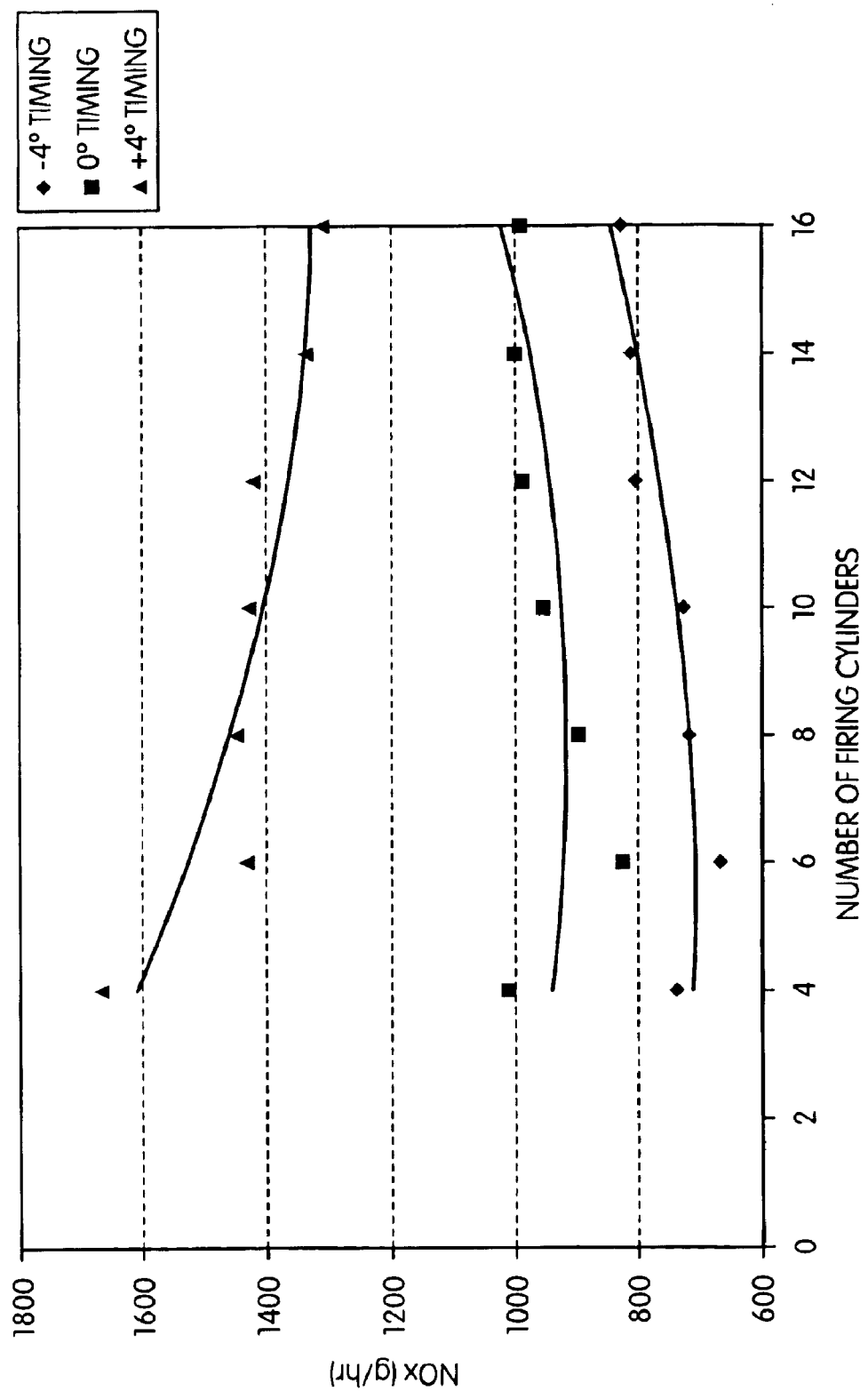
FIG. 18 is a graph illustrating the effect of skipfiring on NOx.
Figure 19:
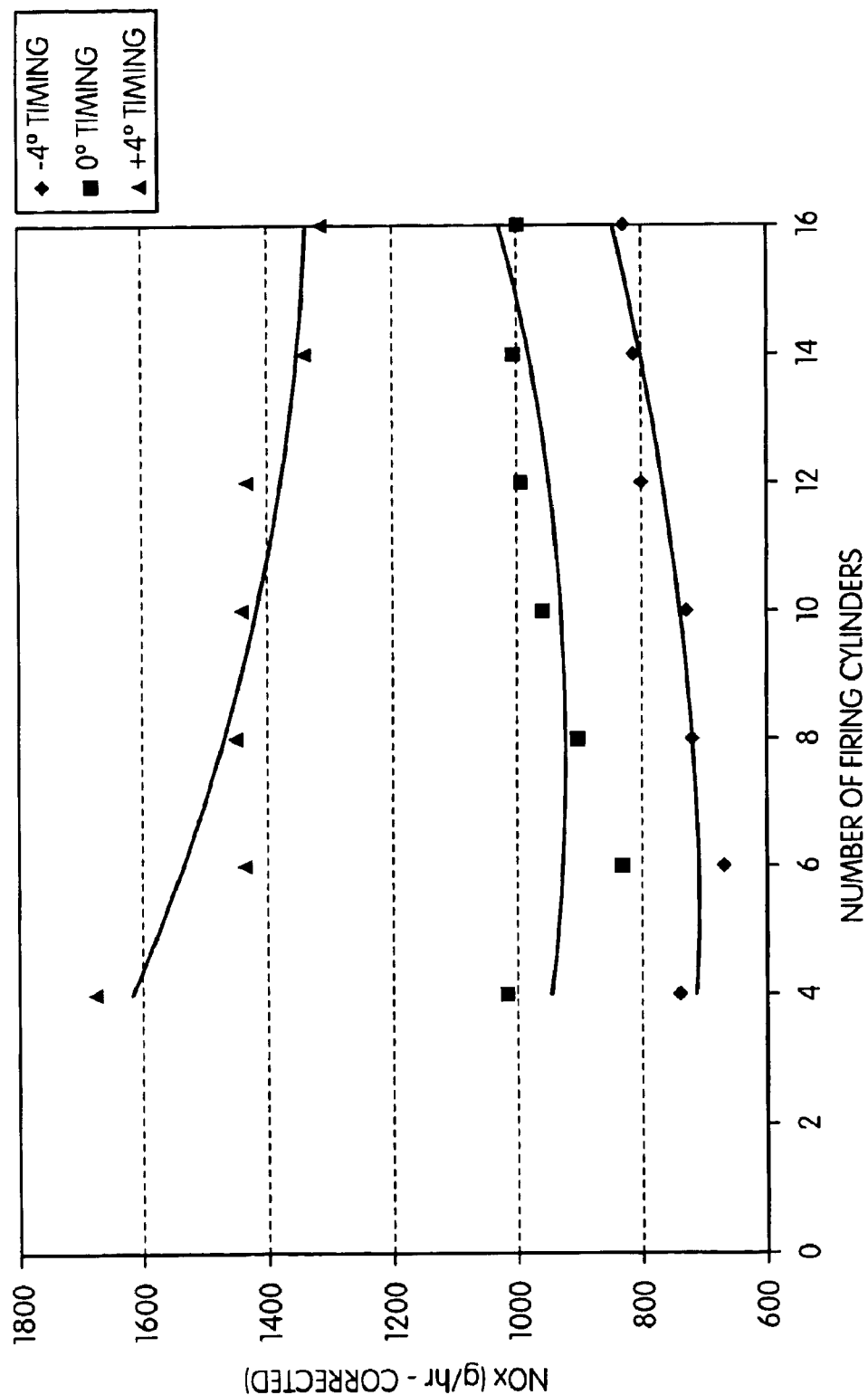
FIG. 19 is a graph illustrating the effect of skipfiring on corrected NOx.
Figure 20:
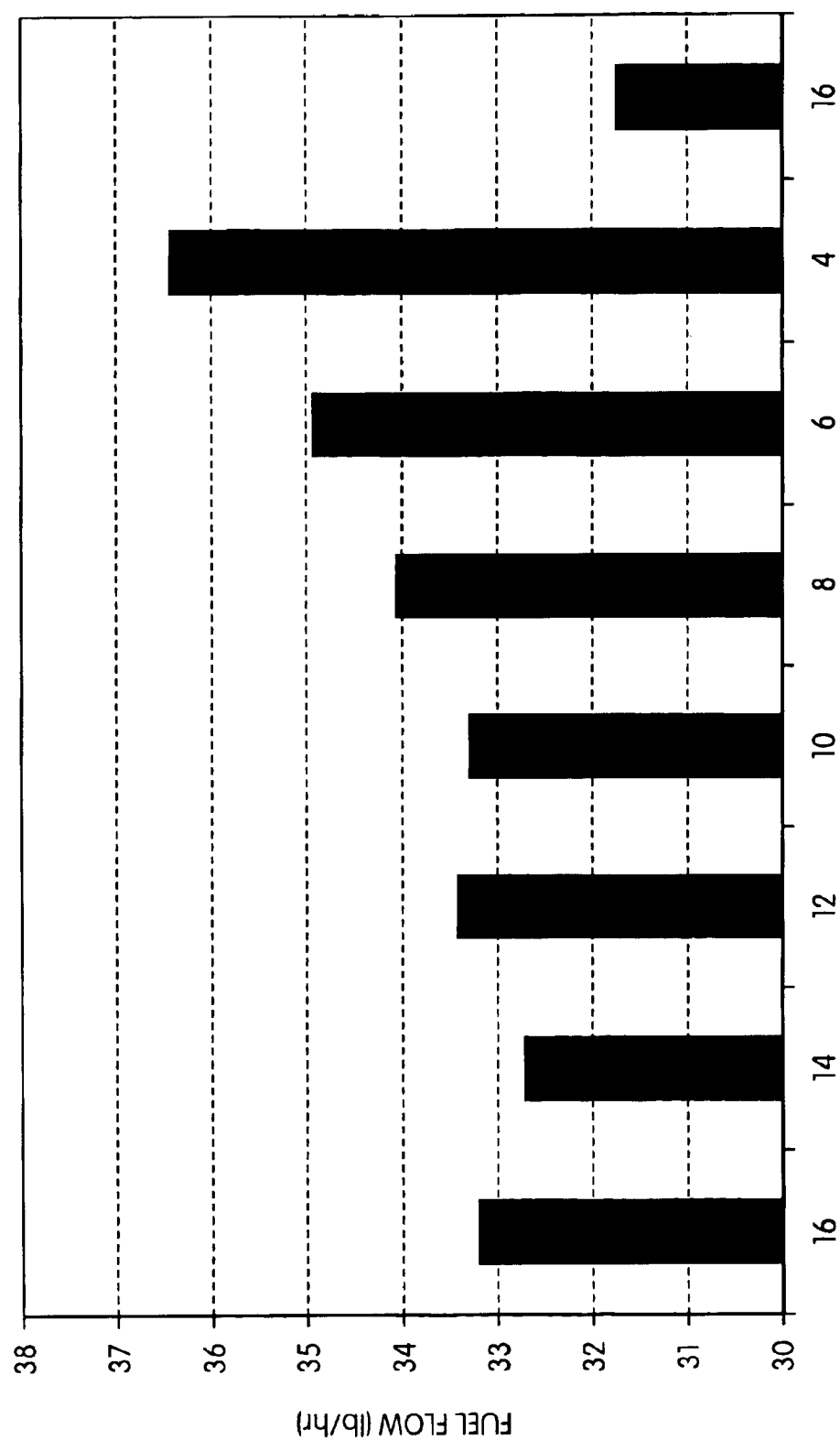
FIG. 20 is a graph illustrating fuel consumption at −4° timing.
Figure 21:
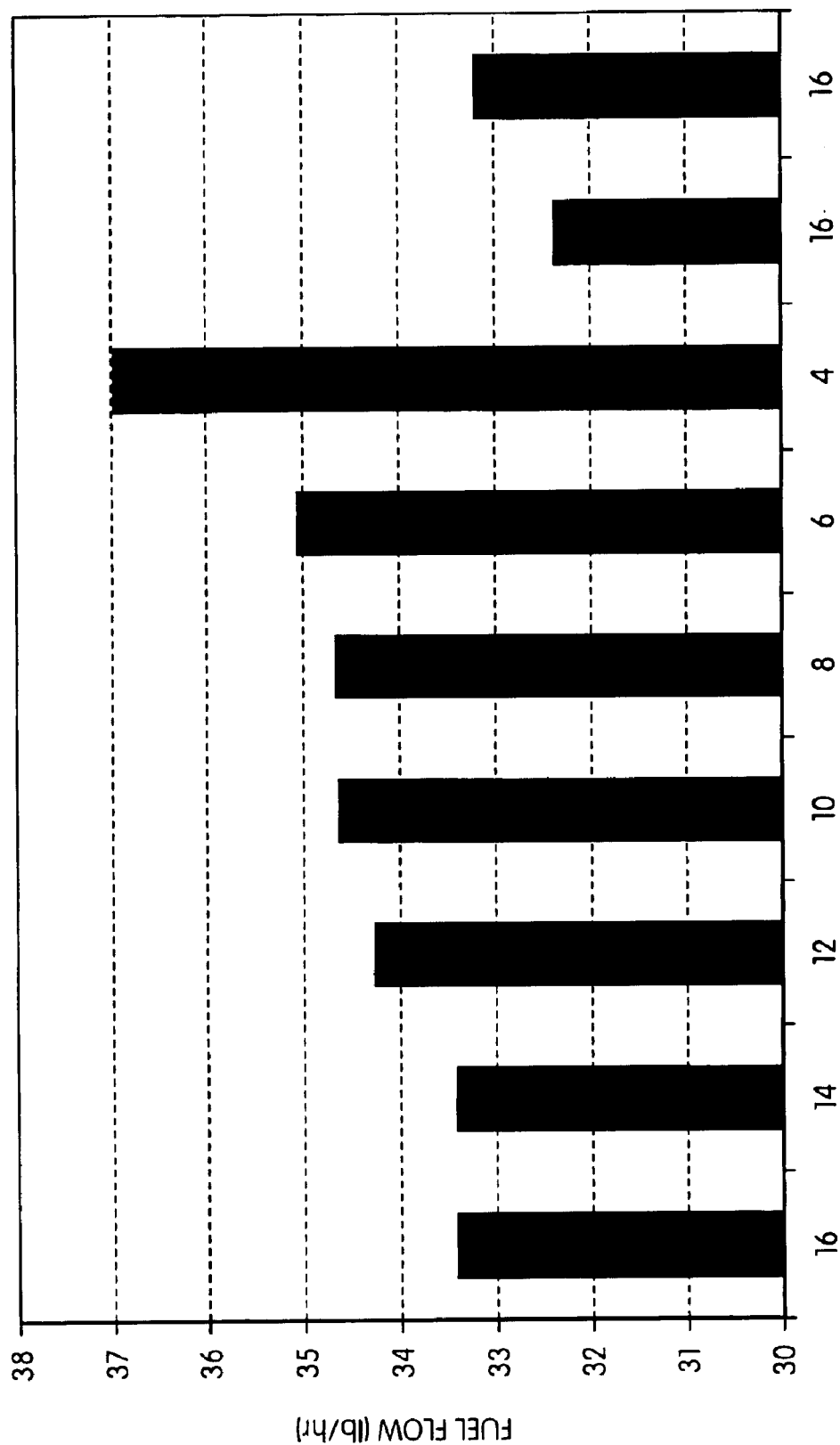
FIG. 21 is a graph illustrating fuel consumption at 0° timing.
Figure 22:
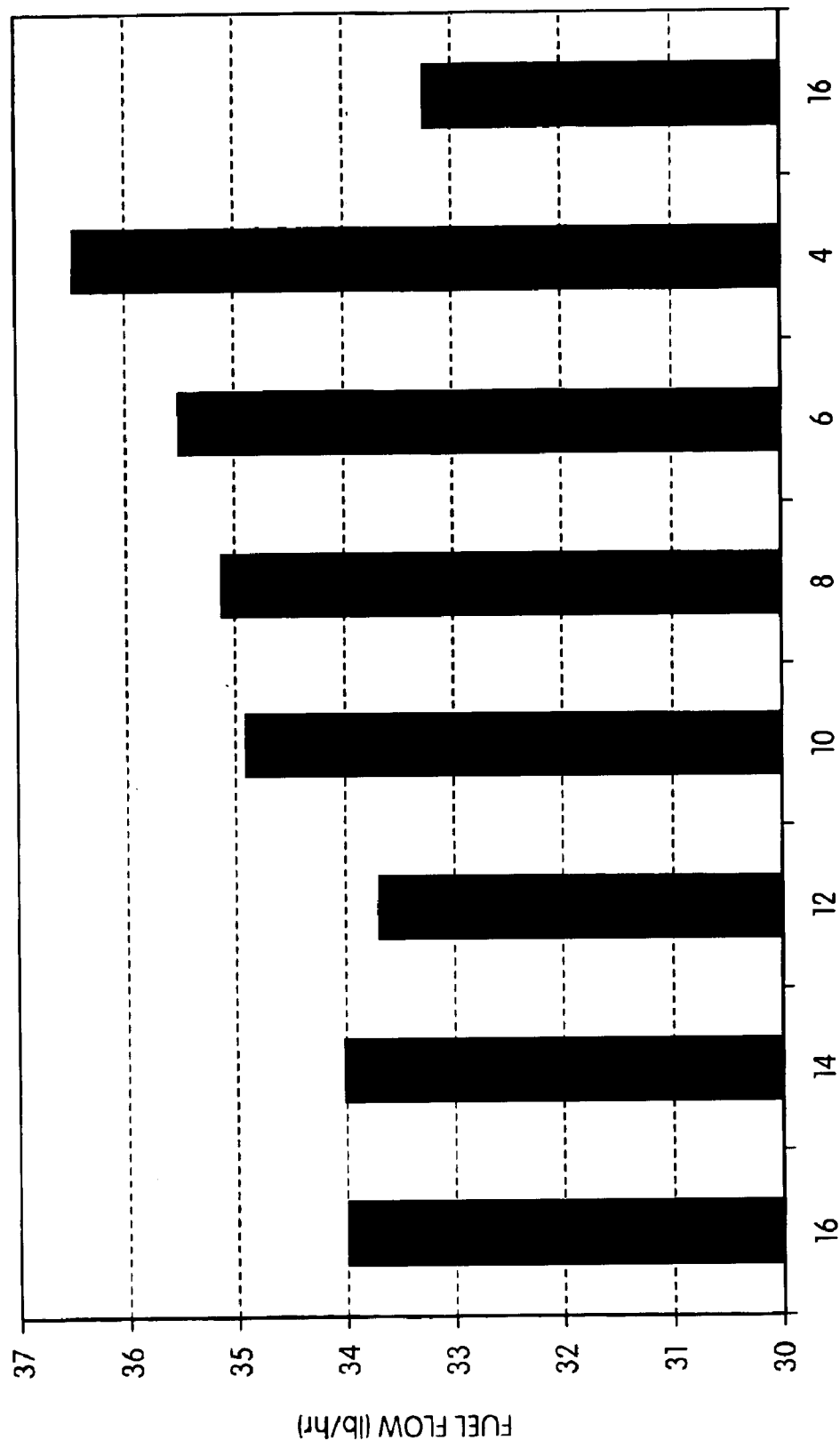
FIG. 22 is a graph illustrating fuel consumption at +4° timing.

For example, FIG. 12 is a flow chart that illustrates an embodiment of the logic used by the skipfire controller 40 of the skipfire control system 10. The sensor 54 monitors or measures the engine speed at step 1 and then the central controller 52 determines whether the skipfire function should be enabled for this engine speed at step 2. If the central controller 52 determines that the engine has been operating below a threshold speed for a predetermined period of time (e.g., during idle), the central controller 52 determines how many cylinders need to be fired to maintain engine speed at step 3. Then, the central controller 52 selects the cylinders 14 to skipfire at step 4, and actuates the selected skipfire mechanisms 38 for those selected cylinders 14 to cut off fuel delivery at step 5. That is, the central controller 52 signals the valve assembly 56 which selectively actuates skipfire mechanisms 38 to engage the selected injector rocker arms 20 so that the respective injectors 15 are not stroked to deliver fuel to the selected cylinders 14. Then, the logic returns back to start and repeats these steps.

If the central controller 52 determines that the engine speed is high enough so that the skipfire function should not be enabled at step 2, the central controller 52 determines whether the engine speed has exceeded an overspeed limit or threshold speed at step 6. If the engine speed does exceed the overspeed limit, the central controller 52 sets the number of firing cylinders 14 to zero at step 7 and selects all cylinders 14 for skipfiring at step 7. Then, the central controller 52 actuates all the skipfire mechanisms 38 for the cylinders 14 to cut off fuel delivery to all the cylinders 14 at step 5. Then, the logic returns back to start and repeats these steps.

If the engine speed does not exceed the overspend limit at step 6, then the central controller 52 confirms that all the skip fire mechanisms 38 have their actuators 42 in the inoperative positions so that fuel is delivered to all the cylinders 14 at step 8. Then, the logic returns back to start and repeats these steps.

As discussed above, the use of skipfiring reduces exhaust emission, such as NOx, CO, and HC, and fuel consumption at low engine speeds. FIGS. 13–22 include graphs that illustrate the effect of skipfiring on fuel consumption, NOx, HC, CO at different valve timing, e.g., −4° timing, 0° timing, and +4° timing.

It can thus be appreciated that the aspects of the present invention have now been fully and effectively accomplished. The foregoing specific embodiments have been provided to illustrate the structural and functional principles of the present invention, and are not intended to be limiting. To the contrary, the present invention is intended to encompass all modifications, alterations and substitutions within the spirit and scope of the appended claims.

What is claimed is:

1. A skipfire control system for use in a locomotive engine including a plurality of fuel injected cylinders, each of the plurality of cylinders having a fuel injector and an injector rocker arm movable to actuate the fuel injector to inject fuel to the associated cylinder, the engine also including a camshaft engagable with each of the injector rocker arms to move the rocker arms for actuation of the fuel injectors, the skipfire control system comprising:

a plurality of skipfire mechanisms, each of the plurality of skipfire mechanisms being operatively associated with a respective injector rocker arm of the plurality of cylinders, each of the plurality of skipfire mechanisms including an actuator movable between (1) an inoperative position wherein the actuator allows the camshaft to engage and move the associated injector rocker arm to actuate the associated fuel injector, and (2) an operative position wherein the actuator disengages the associated injector rocker arm from the camshaft to prevent the associated rocker arm from being moved by the camshaft to actuate the associated fuel injector; and a skipfire controller operatively connected to the plurality of skipfire mechanisms, the skipfire controller being responsive to an engine operating parameter to actuate selected ones of the plurality of skipfire mechanisms so as to move the actuators thereof to the operative positions to thereby prevent actuation of the fuel injectors associated with the selected ones of the plurality of skipfire mechanisms.

2. The skipfire control system according to claim 1, wherein the number of skipfire mechanisms is equal to the number of cylinders of the engine.

3. The skipfire control system according to claim 1, wherein each skipfire mechanism comprises a cylinder and a piston mounted in the cylinder, the cylinder being communicated to a source of pressurized fluid so as to enable the pressurized fluid to move the piston within the cylinder, wherein the movement of the piston moves the actuator between the inoperative and operative positions.

4. The skipfire control system according to claim 3, wherein the pressurized fluid is air.

5. The skipfire control system according to claim 4, wherein a source of pressurized fluid is an air reservoir for operating locomotive pneumatic brakes.

6. The skipfire control system according to claim 1, wherein the skipfire controller monitors the engine operating parameter and actuates selected ones of the plurality of skipfire mechanisms when the engine operating parameter has fallen below a predetermined threshold for a predetermined period of time.

7. The skipfire control system according to claim 1, wherein the engine operating parameter is engine speed.

8. The skip fire control system according to claim 1, wherein the skipfire controller controls a plurality of valves operatively connected to an associated skipfire mechanism such that selected ones of the plurality of valves can be actuated to allow a source of pressurized fluid to move the actuator of the associated skipfire mechanism to its operative position.

9. A locomotive comprising:

an engine including a plurality of fuel injected cylinders, each cylinder having a fuel injector and an injector rocker arm movable to actuate the fuel injector to inject fuel to the associated cylinder, the engine also including a camshaft engagable with each of the injector rocker arms to move the rocker arms for actuation of the fuel injectors; and a skipfire control system comprising:

a plurality of skipfire mechanisms, each of the plurality of skipfire mechanisms being operatively associated with a respective injector rocker arm of the plurality of cylinders, each of the plurality of skipfire mechanisms including an actuator movable between (1) an inoperative position wherein the actuator allows the camshaft to engage and move the associated injector rocker arm to actuate the associated fuel injector, and (2) an operative position wherein the actuator disengages the associated injector rocker arm from the camshaft to prevent the associated rocker arm from being moved by the camshaft to actuate the associated fuel injector; and a skipfire controller operatively connected to the plurality of skipfire mechanisms, the skipfire controller being responsive to an engine operating parameter to actuate selected ones of the plurality of skipfire mechanisms so as to move the actuators thereof to the operative positions to thereby prevent actuation of the fuel injectors associated with the selected ones of the plurality of skipfire mechanisms.

10. The locomotive according to claim 9, wherein the engine is a two-stroke diesel engine.

11. The locomotive according to claim 9, wherein the engine includes 16 cylinders.

12. The locomotive according to claim 9, wherein each fuel injector includes an injector plunger that is movable by the injector rocker arm from an extended position to a depressed position to actuate the injector, the plunger being biased by a spring into the extended position.

13. The locomotive according to claim 9, wherein the number of skipfire mechanisms is equal to the number of cylinders of the engine.

14. The locomotive according to claim 9, wherein each skipfire mechanism comprises a cylinder and a piston mounted in the cylinder, the cylinder being communicated to a source of pressurized fluid so as to enable the pressurized fluid to move the piston within the cylinder, wherein the movement of the piston moves the actuator between the inoperative and operative positions.

15. The locomotive according to claim 14, wherein the pressurized fluid is air.

16. The locomotive according to claim 15, wherein a source of pressurized fluid is an air reservoir for operating locomotive pneumatic brakes.

17. The locomotive according to claim 9, wherein the skip fire controller monitors the engine operating parameter and actuates selected ones of the plurality of skipfire mechanisms when the engine operating parameter has fallen below a predetermined threshold for a predetermined period of time.

18. The locomotive according to claim 9, wherein the engine operating parameter is engine speed.

19. The locomotive according to claim 9, wherein the skipfire controller controls a plurality of valves operatively connected to an associated skipfire mechanism such that selected ones of the plurality of valves can be actuated to allow a source of pressurized fluid to move the actuator of the associated skipfire mechanism to its operative position.

20. A method of skipfiring a locomotive engine including a plurality of fuel injected cylinders, each of the plurality of cylinders having a fuel injector and an injector rocker arm movable to actuate the fuel injector to inject fuel to the associated cylinder, the engine also including a camshaft engagable with each of the injector rocker arms to move the rocker arms for actuation of the fuel injectors, the method comprising:

providing a plurality of skipfire mechanisms, each of the plurality of skipfire mechanisms operatively associated with a respective injector rocker arm of the plurality of cylinders, each of the plurality of skip fire mechanisms including an actuator movable between (1) an inoperative position wherein the actuator allows the camshaft to engage and move the associated injector rocker arm to actuate the associated fuel injector, and (2) an operative position wherein the actuator disengages the associated injector rocker arm from the camshaft to prevent the associated rocker arm from being moved by the camshaft to actuate the associated fuel injector;

monitoring an engine operating parameter; and actuating selected ones of the plurality of skipfire mechanisms responsive to the engine operating parameter so as to move the actuators thereof to the operative positions to thereby prevent actuation of the fuel injectors associated with the selected ones of the plurality of skipfire mechanisms.

21. The method according to claim 20, wherein selected ones of the plurality of skipfire mechanisms are actuated when the engine operating parameter falls below a predetermined threshold for a predetermined period of time.

22. The method according to claim 20, wherein the engine operating parameter is engine speed.

23. The method according to claim 20, further comprising controlling a plurality of valves operatively connected to an associated skipfire mechanism such that selected ones of the plurality of valves can be actuated to allow a source of pressurized fluid to move the actuator of the associated skipfire mechanism to its operative position.

* * * * *